(12) United States Patent
Thomson

(10) Patent No.: US 6,991,848 B2
(45) Date of Patent: *Jan. 31, 2006

(54) FOAM COMPOSITE

(75) Inventor: Timothy Thomson, West Newbury, MA (US)

(73) Assignee: Hydrophilix LLC, Portland, ME (US)

( * ) Notice: Subject to any disclaimer, the term of this patent is extended or adjusted under 35 U.S.C. 154(b) by 194 days.

This patent is subject to a terminal disclaimer.

(21) Appl. No.: 10/421,283

(22) Filed: Apr. 23, 2003

(65) Prior Publication Data

US 2003/0203182 A1 Oct. 30, 2003

Related U.S. Application Data

(63) Continuation of application No. 09/823,129, filed on Mar. 30, 2001, now abandoned, which is a continuation-in-part of application No. 09/540,099, filed on Mar. 31, 2000, now Pat. No. 6,617,014.

(51) Int. Cl.
B32B 3/26 (2006.01)

(52) U.S. Cl. .............. 428/316.6; 428/306.6; 428/308.4; 428/315.7; 428/317.9

(58) Field of Classification Search .......... 428/316.6, 428/308.4, 315.7, 304.4, 306.6, 317.9
See application file for complete search history.

(56) References Cited

U.S. PATENT DOCUMENTS

| 4,957,810 A | 9/1990 | Eleouet et al. |
| 5,837,377 A | 11/1998 | Sheu et al. |
| 6,617,014 B1 * | 9/2003 | Thomson ............... 428/304.4 |

FOREIGN PATENT DOCUMENTS

| EP | 0335669 | 10/1989 |
| EP | 0691113 | 1/1996 |

* cited by examiner

Primary Examiner—Hai Vo
(74) Attorney, Agent, or Firm—Kramer Levin Naftalis & Frankel LLP; Barry Evans, Esq.

(57) ABSTRACT

A foam composite made up of a scaffold of an open cell hydrophobic material having plurality of surfaces defining a plurality of pores, and a coating of a substantially hydrophilic foam material disposed upon the surfaces of the hydrophobic foam. The resulting foam composite exhibits structural characteristics of the hydrophobic foam and absorbency characteristics of the hydrophilic foam.

34 Claims, 21 Drawing Sheets

Figure 1: Conventional Reticulated Foam with Hydrophilic Foam Coating
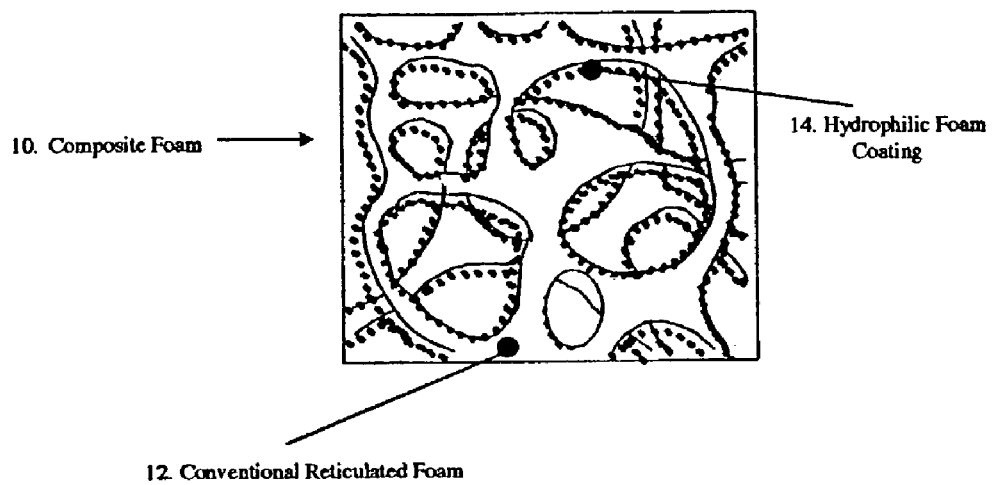
10. Composite Foam
14. Hydrophilic Foam Coating
12. Conventional Reticulated Foam
Figure 2: Pressure Drop across a Reticulated Foam at 575 Ft/min
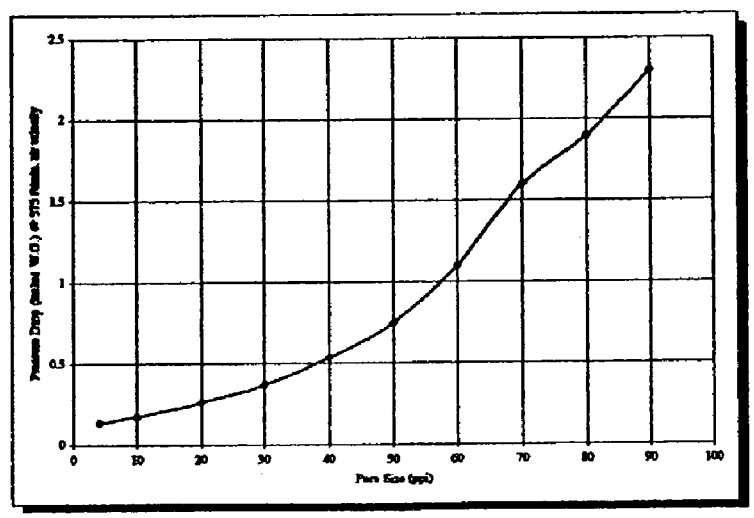

Figure 3: Surface Area as a Function of Pore Size
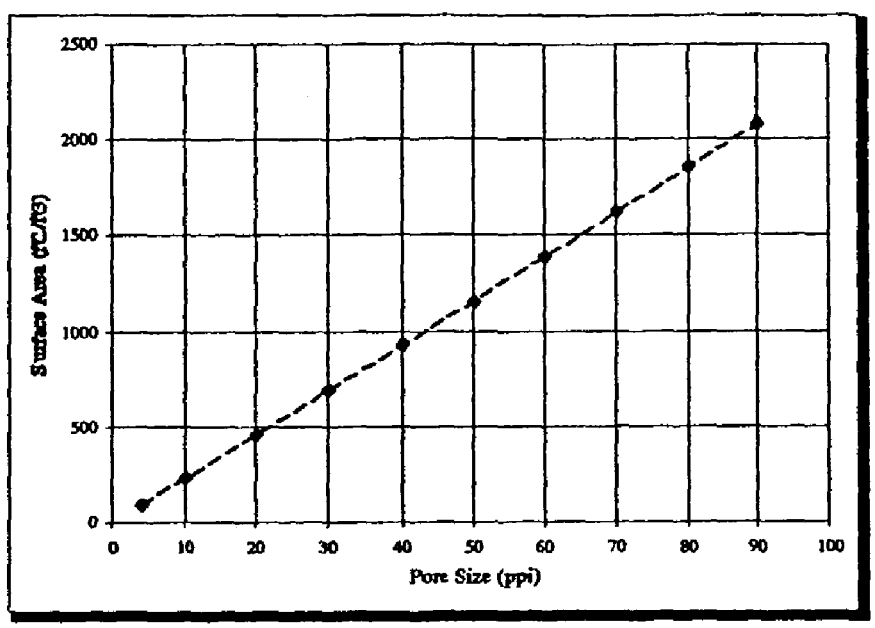
Figure 4: Juxtaposition of CO2 and Polymerization Reaction and Effect on Foam
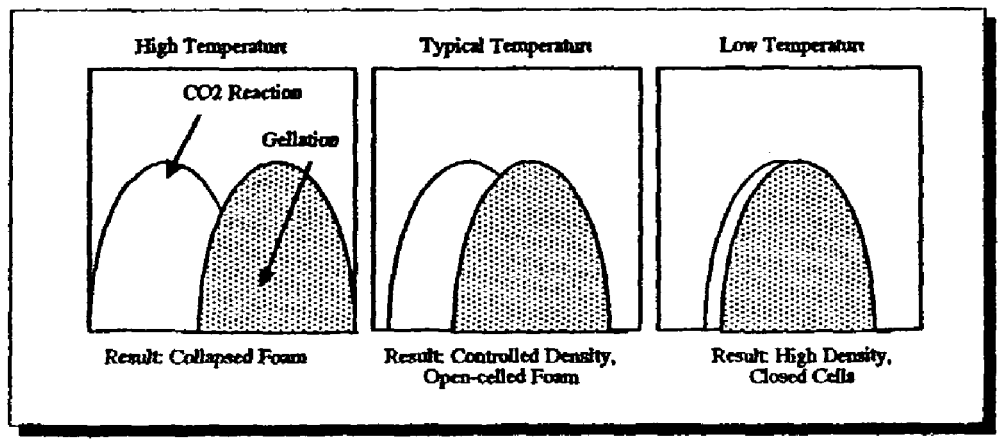

Figure 5: Manufacturing Process for Hydrophilic Polyurethane Foams
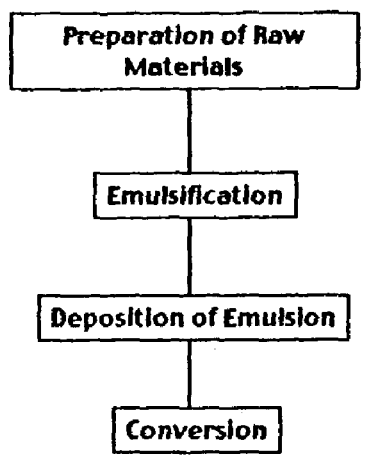
Figure 6: Process for the Emulsification of a Hydrophilic Prepolymer
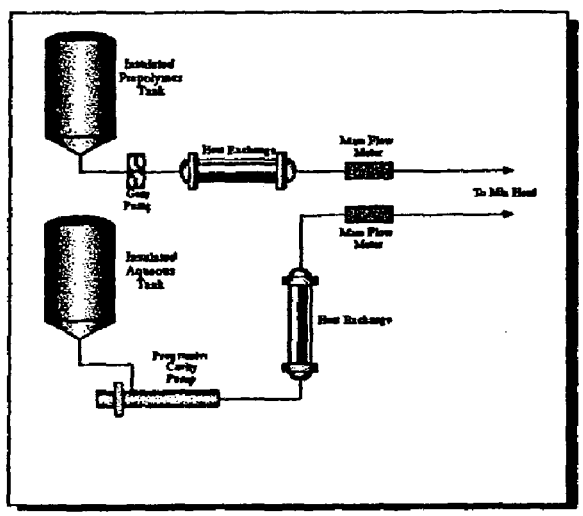

Figure 7: Pin Mixer for the Emulsification of the Prepolymer and Aqueous Phases
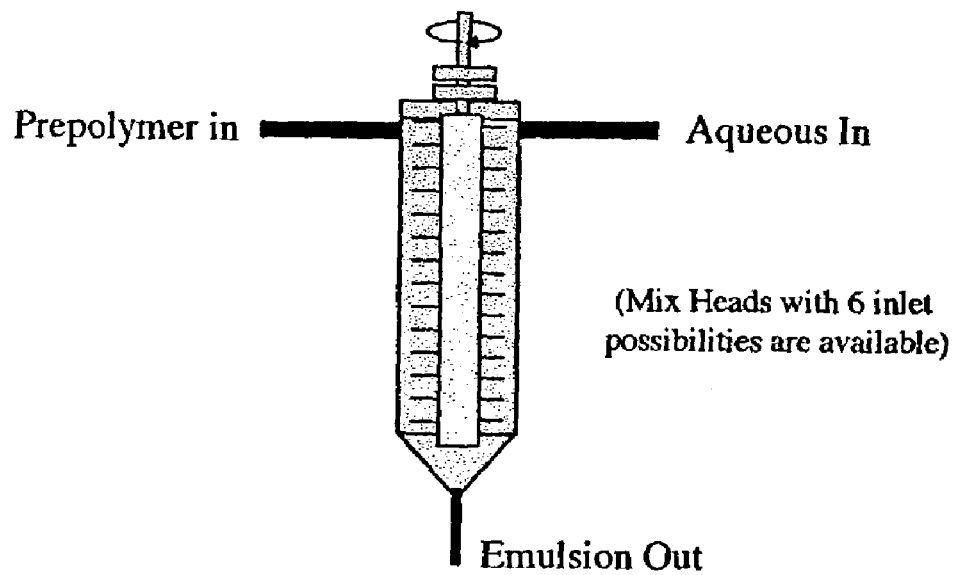
(Mix Heads with 6 inlet possibilities are available)
Figure 8: Process to Manufacture the Composite by the Emulsion Process
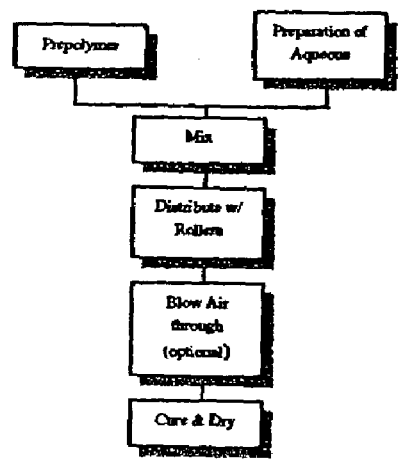

Figure 9: The Viscosity of Hydrophilic polyurethane Prepolymers
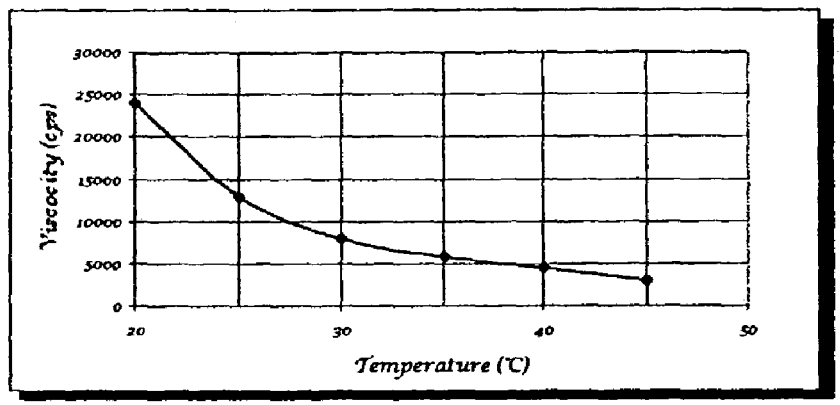
Figure 10: Process to Manufacture the Composite by the Solvent Process
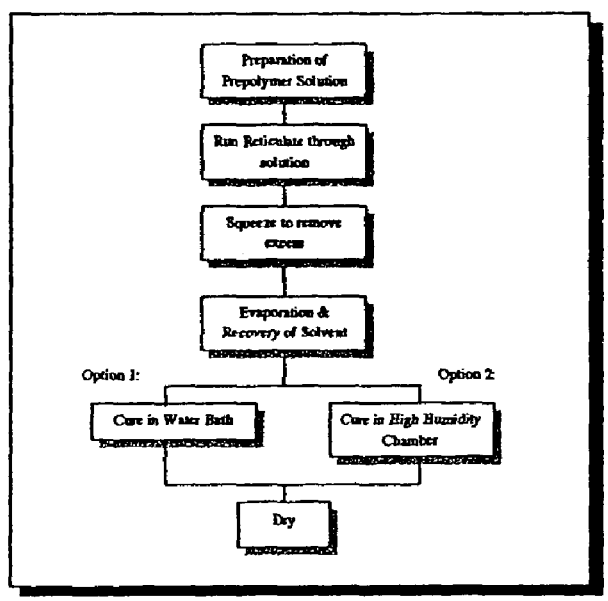

Figure 11: Process to Manufacture the Composite by the Direct Cast Process
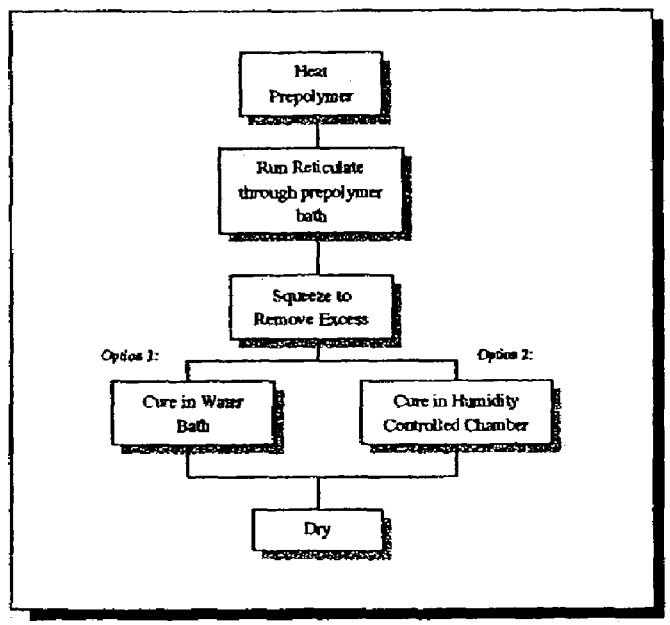
Figure 12: Use as a Growing Media
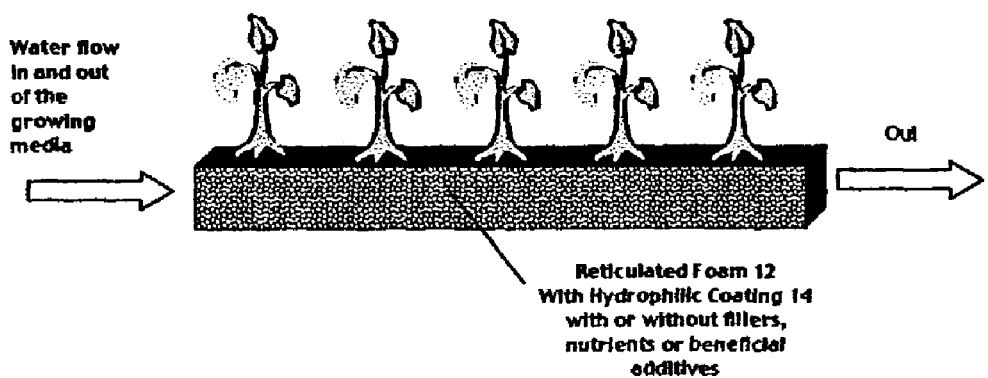

Figure 13: Controlled Release Device
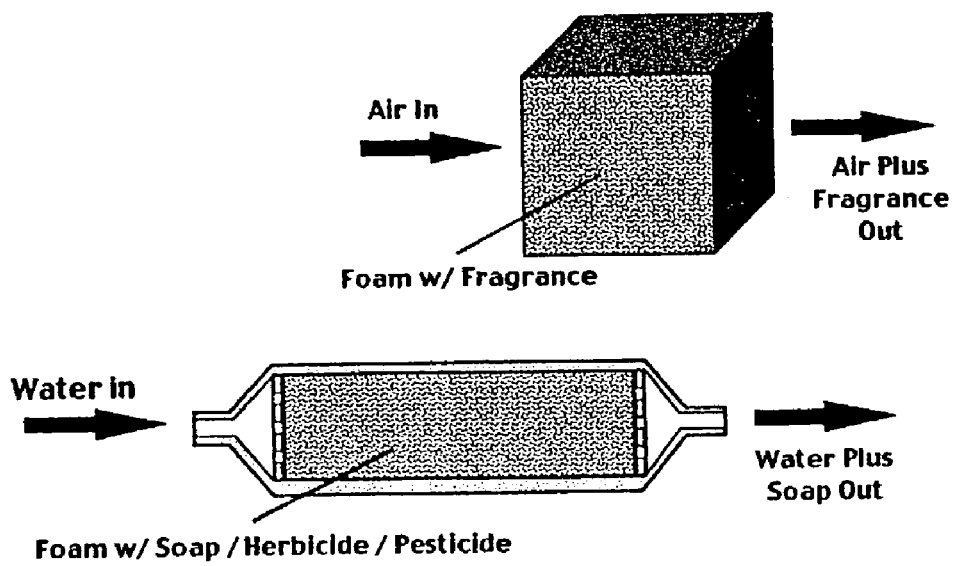
Figure 14: Cell for Bioremediation
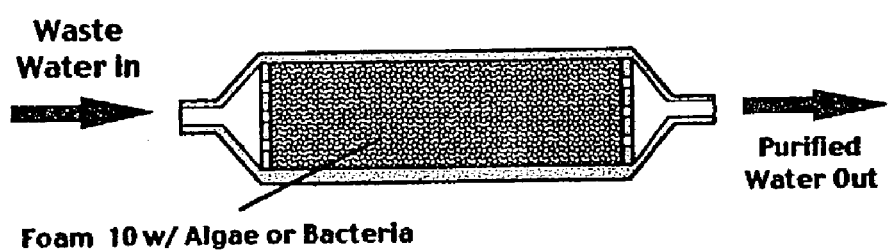

Figure 15: Treatment of Sugar-Containing Water
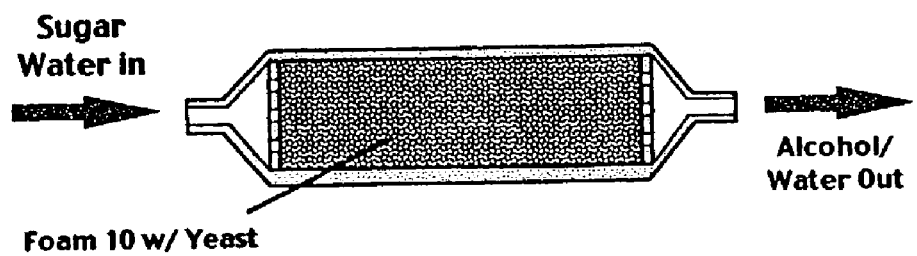
Figure 16: Treating Milk w/ Lactase
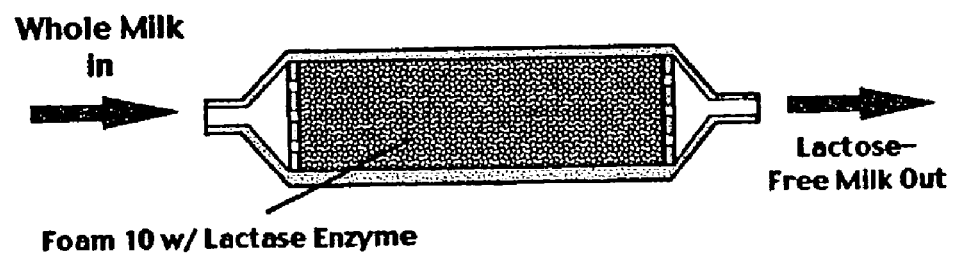

Figure 17: Enzymatic Reactor
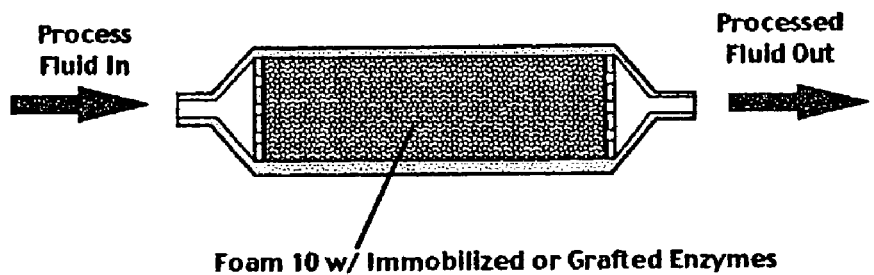
Figure 18: Use of the Invention as a Femoral Shunt Device
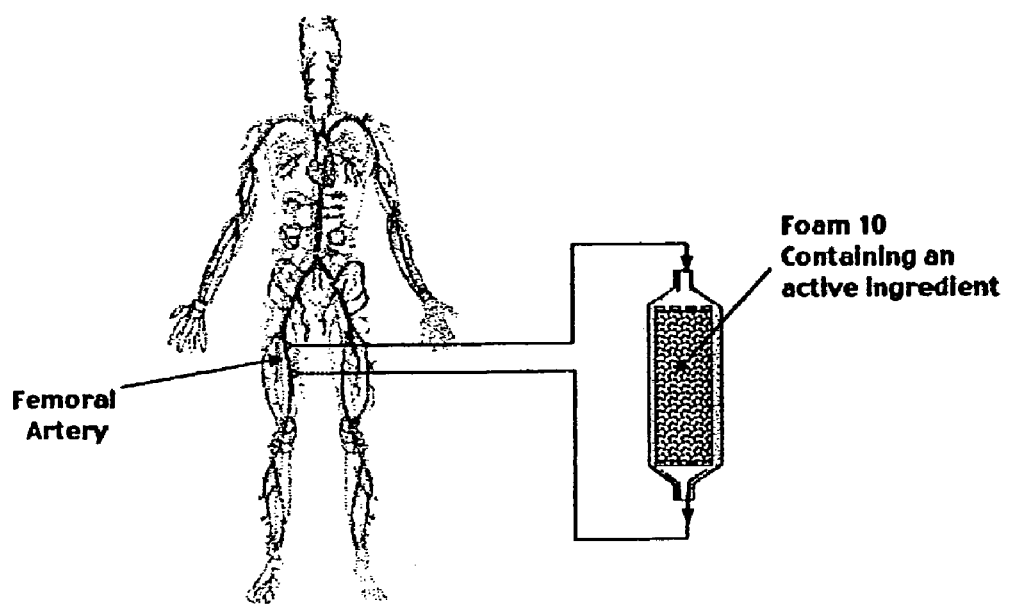

Figure 19: Scaffold for the Propagation of Cells
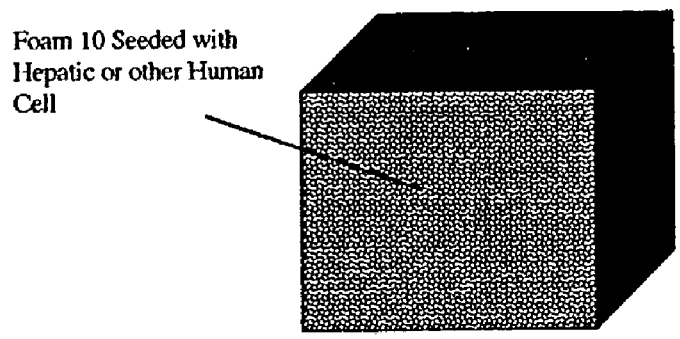
Figure 20: Drug Delivery System
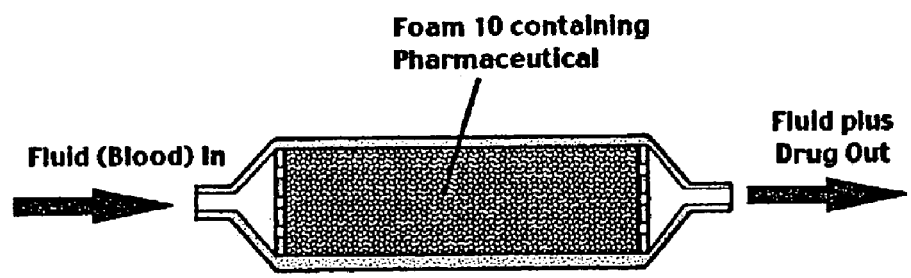

Figure 21: Adsorption Cell
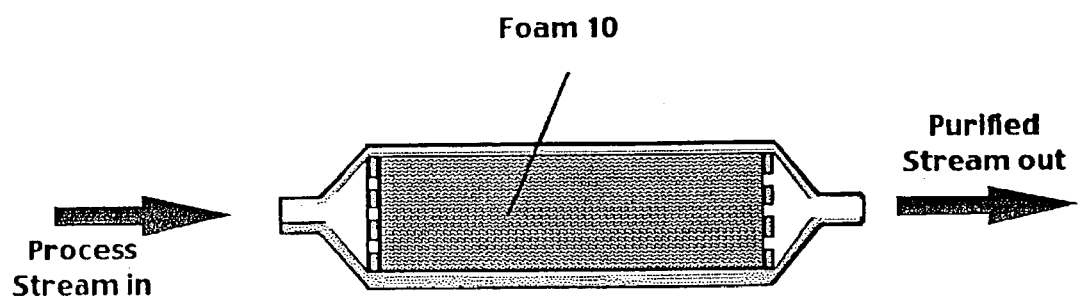
FOR THE REMOVAL OF CONTAMINANTS FROM THE
FLUID BY THE ADSORPTION EFFECT
Figure 22: Removal of Drugs from Blood
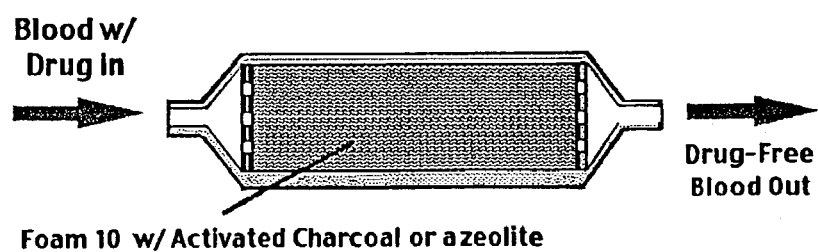
Foam 10 w/ Activated Charcoal or a zeolite

Figure 23: De-ionizing Water
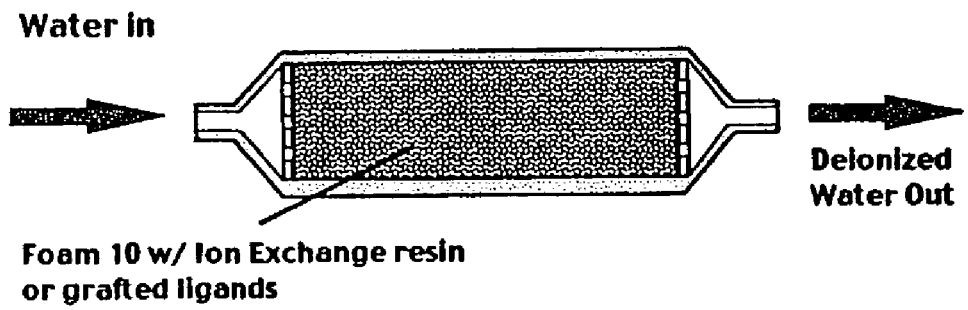
Figure 24: Humidifier for Incubators
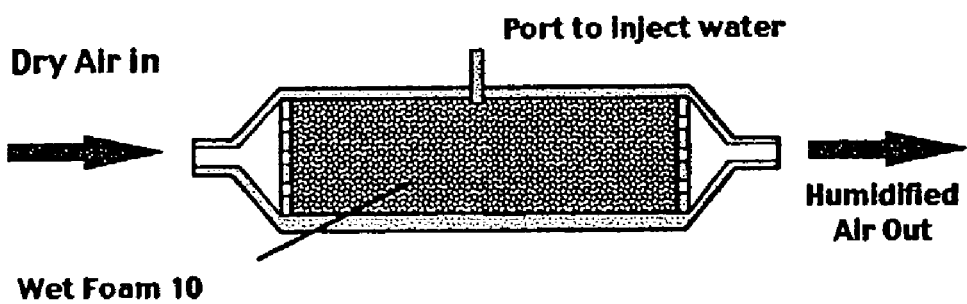

Figure 25: Humidifier for Anesthetics
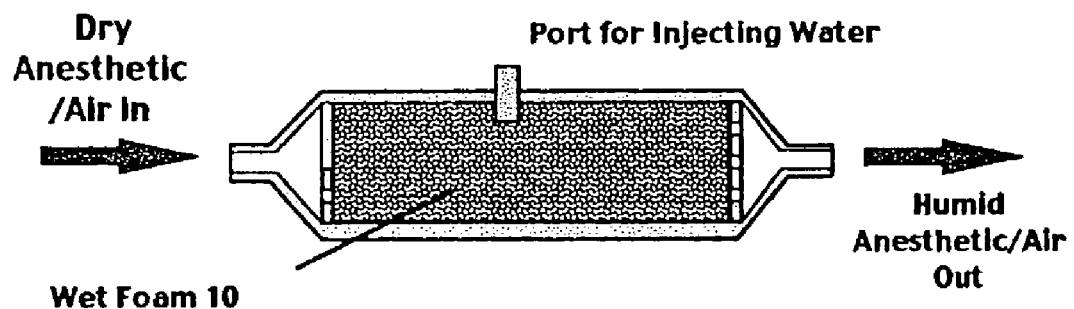
Figure 26: Administering Anesthetic
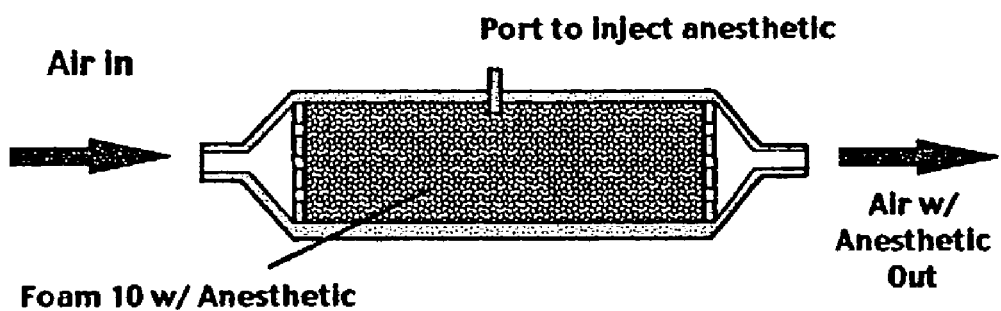

Figure 27: Drying of Hydrocarbons
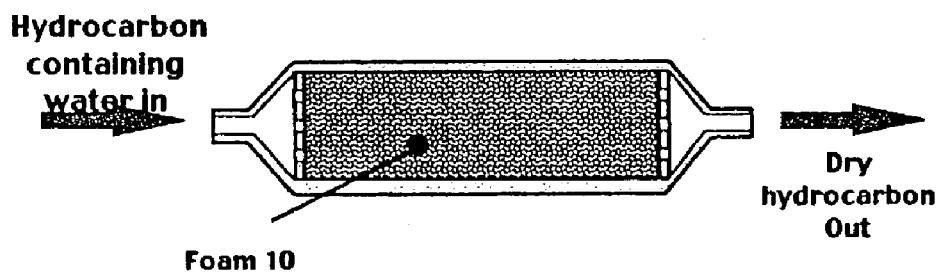
Figure 28: Respirator
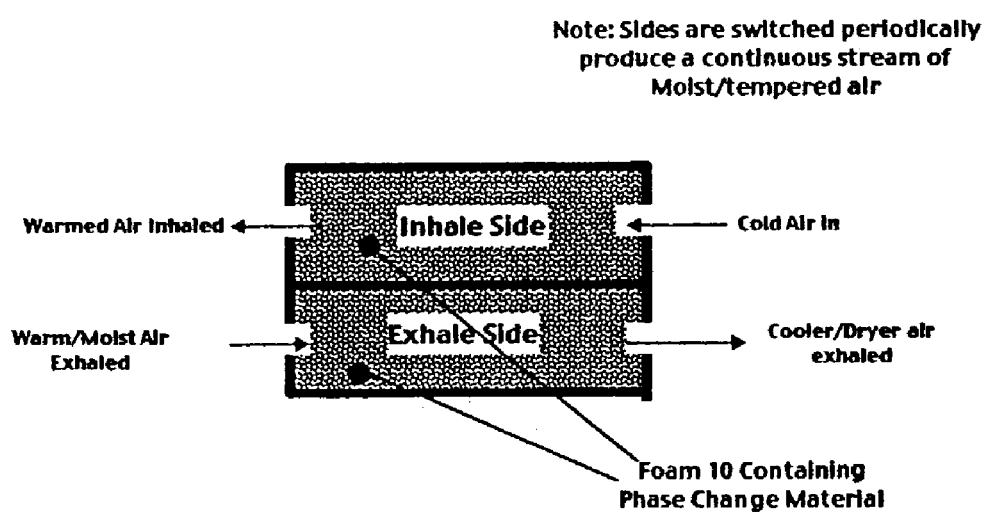

Figure 29: Flow-Through Diagnostic Device
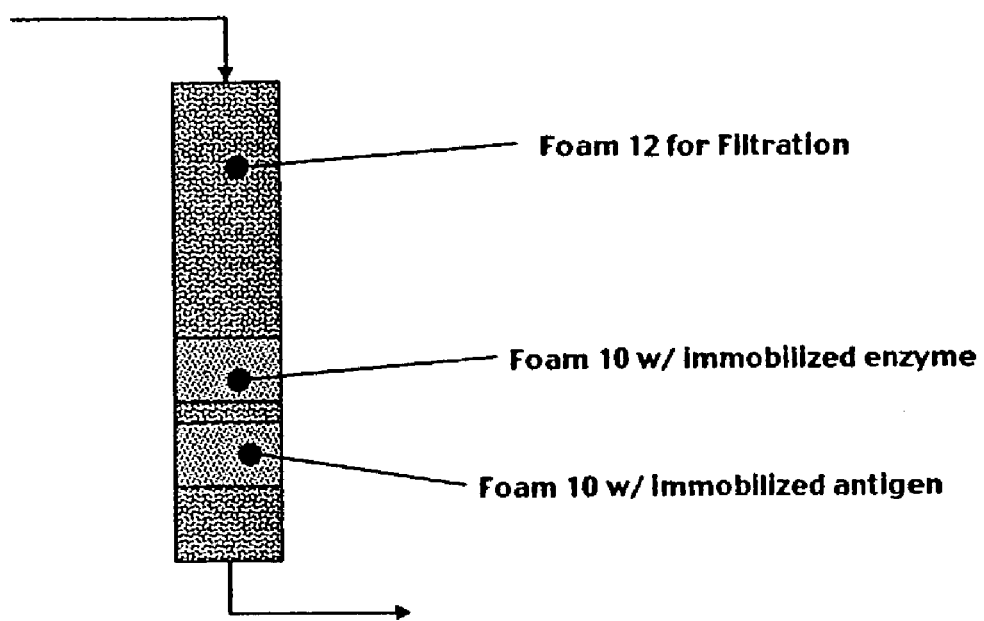
- Foam 12 for Filtration
- Foam 10 w/ immobilized enzyme
- Foam 10 w/ immobilized antigen
Figure 30: Apparatus for Measuring the Pressure drop of Water through the Composite
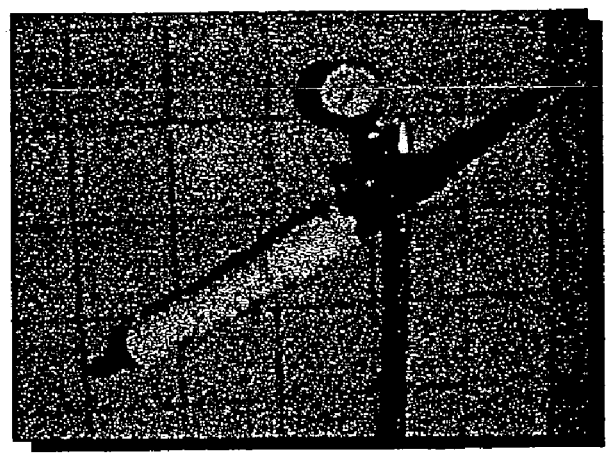

Figure 31: Relationship of Flow Rate of Water and Pressure Drop
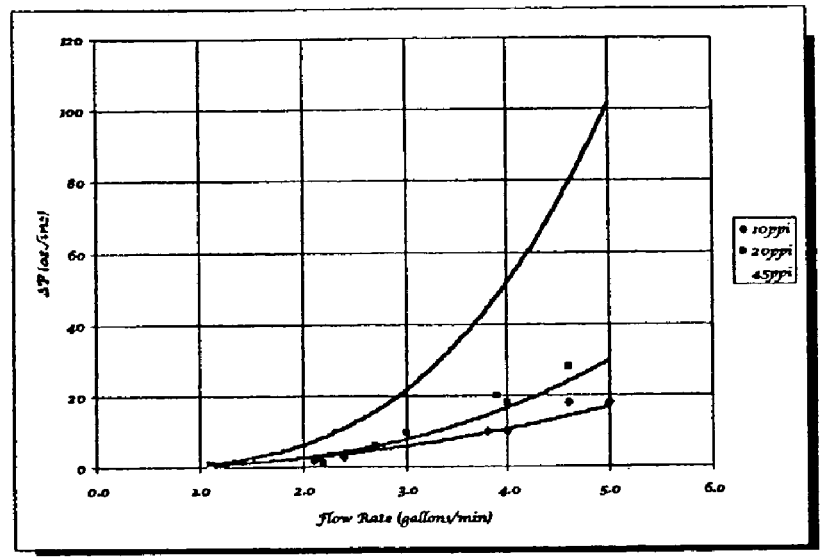
Figure 32: Relationship of Flow Rate and ΔP in the Composite of Several Coating Weights
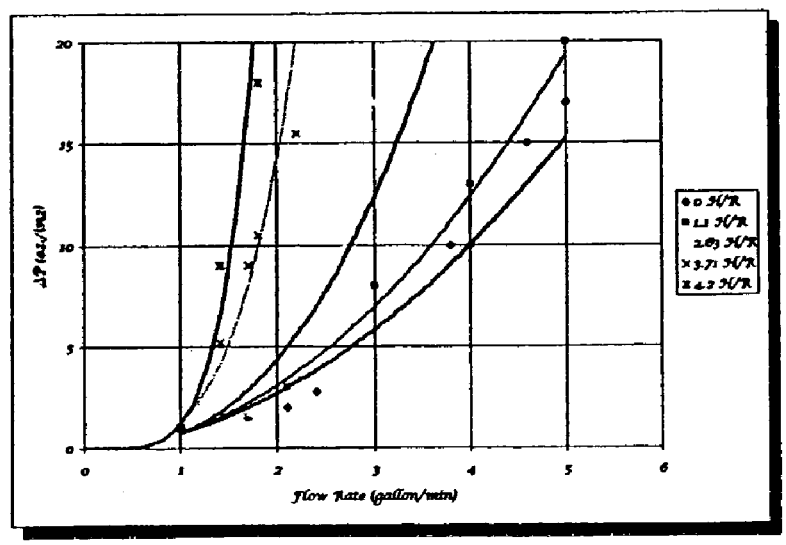

Figure 33: Coating Weight of Hydrophilic Foam as a Function of Prepolymer Concentration
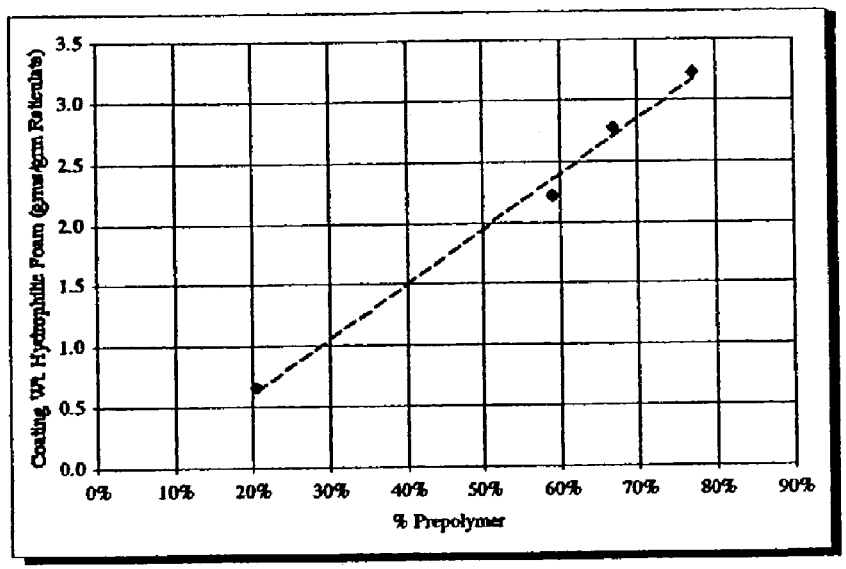
Figure 34: Coating Weight of Hydrophilic Foam as a Function of Prepolymer Temperature
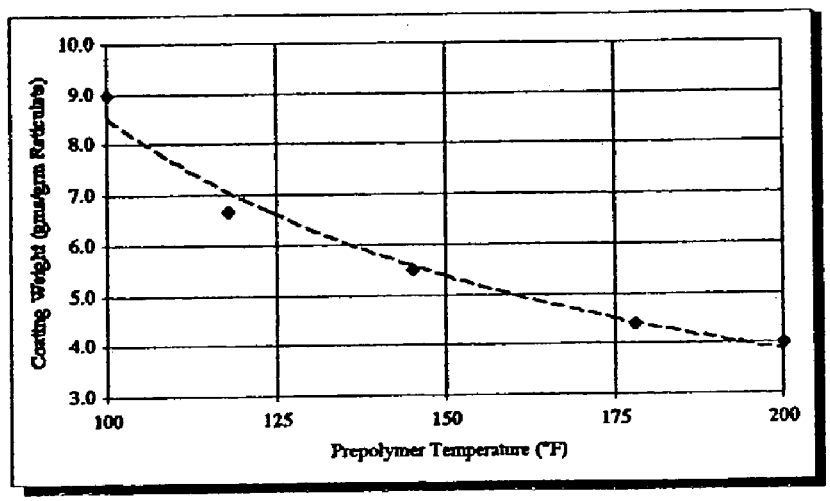

Cartridge

FOAM COMPOSITE

RELATED APPLICATION

This application is a continuation of U.S. application Ser. No. 09/823,129 filed Mar. 30, 2001, now abandoned, which is a continuation-in-part of U.S. application Ser. No. 09/540,099 filed Mar. 31, 2000, now U.S. Pat. No. 6,617,014. The subject matter of both applications are hereby incorporated by reference.

FIELD OF THE INVENTION

The present invention relates to the field of polymer chemistry and, in particular, to the field of foam composites having properties of both conventional hydrophobic and hydrophilic polyurethane foams.

BACKGROUND OF THE INVENTION

Conventional polyurethanes have taken a prominent position in the world as an inexpensive material for use in such diverse applications as foam insulation, adhesives, structural foams, shoe sole and others. The properties of conventional polyurethanes that make these uses possible are its physical strength, low cost, ability to make very low density foam, chemical resistance, and thermal stability.

One of the variations of the product family is the manufacture of what are called reticulated foams. These foams are constructed such that the "windows" that separate the individual cells making up the foam structure are open and the material in the windows collapse into the "struts and beams". Thus when fully cured and viewed in a microscope, all one sees is a matrix of "tinker-toy-like" rods connected to one another at the ends. One of the advantages of this structure is that it presents very low resistance to the flow of air or water. It is often used as a filter media due to their typically low density and corresponding low cost per unit volume. These foams are hydrophobic, i.e. they do not absorb water.

Hydrophilic polyurethanes, on the other hand, while being of similar chemistry, are used in applications where being compatible with water is the primary reason for their use. These uses include controlled delivery devices, chronic wound care dressings and agricultural media.

An advantage of hydrophilic polyurethanes over conventional reticulated polyurethanes is their ability to be formulated with active ingredients. Hydrophilic polyurethanes are conventionally made by the emulsification and curing of an aqueous phase with a hydrophilic polyurethane prepolymer. The aqueous phase may contain an active ingredient in which case the ingredient is dispersed in the matrix of the resultant foam. In part, it is this ability to incorporate a wide variety of components in the aqueous phase that makes this chemistry commercially attractive.

The essential difference between these two related chemistries is that the hydrophilic polyurethane is compatible with and absorbs water while the conventional polyurethanes are hydrophobic and are incompatible with water. While this hydrophilic nature gives hydrophilic polyurethane its unique applications, it also leads to certain deficiencies. Among these are low physical strength, poor cell size control, relatively high densities causing a relatively high cost per unit volume, and the fact that foam swells considerably upon absorption.

OBJECTS OF THE INVENTION

It is an object of the present invention to provide improved foam composites which have properties of both conventional hydrophobic and hydrophilic polyurethane foams. It is another object of the present invention to provide foam composites which can be used as devices to release active ingredients into a fluid stream.

SUMMARY OF THE INVENTION

The present invention which addresses the needs of the prior art provides broadly composite polyurethanes that include both hydrophobic and hydrophilic polyurethane foam entities. By combining these two types of foams, the resulting composite overcomes the disadvantages associated with each, while maintaining their respective advantages.

The composite includes a hydrophobic scaffold foam, such as an open cell or open cell reticulated polyurethane foam, coated with an open cell hydrophilic polyurethane foam. This is accomplished by coating the inside surface of the open cell foam with a polyurethane prepolymer emulsion and allowing the composite to cure. What results is a foam composite that uses the open cell polyurethane foam as a scaffold or a substrate on which the hydrophilic polyurethane foam is cast.

In another aspect of the present invention, the composite foams are formed by contacting a reticulated hydrophobic polyurethane foam with a solution of a hydrophilic polyurethane prepolymer in a solvent such as acetone and the like. The solvent of the polyurethane prepolymer solution is subsequently recovered thus coating the reticulated hydrophobic polyurethane foam with the hydrophilic polyurethane prepolymer.

In another embodiment of the invention the composite foams are provided by contacting the hydrophobic polyurethane foam with a liquid phase of a hydrophilic polyurethane prepolymer at temperatures sufficient to lower the viscosity and thereby control the coating weight of the hydrophilic prepolymer.

It is yet another aspect of the invention to provide a composite that overcomes the disadvantages of both hydrophobic and hydrophilic foams while maintaining their respective advantages. Specifically, the hydrophilic coating, which may or may not contain an active ingredient, provides for the hydrophilic character, while the reticulated foam provides for physical strength and the good flow-through aspects that characterize a reticulated foam. Thus, while the hydrophilic coating will swell when it absorbs water, the reticulated foam is sufficiently strong to prevent an increase in the size of the composite.

It is a further aspect of the invention to provide a composite for use as a device for the controlled release of a component into a stream of fluid passing through it. The stream can be a gas or liquid, but in either case the action of the composite is to release into the stream a component resident in the hydrophilic polyurethane foam coating. Examples include devices for the controlled release of a pharmaceutical to blood, the controlled release of a fragrance to an air stream, the controlled release of a soap to water stream, and the humidification of a gas stream by the evaporation of water from the hydrophilic coating.

It is a further aspect of the invention to provide a composite for use as a device that will chemically or biologically act on the stream that passes through it. The stream can be a gas or liquid, but in either case the action of the composite is to act upon the stream to produce a chemical or compositional change. One example being a device for the bioremediation of a waste stream through the action of bacteria, enzymes, algae, yeasts or other biological species on the waste stream. Another example includes devices that produce an action comparable to those of living cells, such as liver cells, on physiological fluids to remove or react natural or synthetic toxins. Another example includes devices doped or grafted with ion exchange resins for removing complex inorganic ions from the stream. Further examples include devices having foams in doped or grafted with activated carbons or zeolite which have the ability to remove components from a stream by an adsorption or entrapment mechanism. Another example includes devices for the production or removal of chemicals in a process stream through the action of bacteria, enzymes, algae, yeasts or other biological species. Still another example includes devices for the removal of organic species from a process stream by adsorption on the surface of the hydrophilic coating.

Finally, other examples might be the removal of water from a process stream through absorption by the hydrophilic polyurethane foam.

It is a further aspect of the invention to provide a composite for use in devices for the moderation of inhaled air temperatures in low temperature environments. One example of such a device moderates the temperature of inhaled air by passing the air stream over an appropriate phase change material entrapped in the hydrophilic coating. The heat contained in the exhaled air is subsequently trapped by breathing out through another chamber that also contains the phase change material.

It is a still further aspect of the invention to provide a composite for use as an advanced soil-less growing media.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 1 is a schematic view of the foam composite of the present invention.

FIG. 2 shows the pressure drop of hydrophobic polyurethane foams at 575 ft/min of air.

FIG. 3 is a graph of the surface area of hydrophobic polyurethane as a function of pore size.

FIG. 4 illustrates the juxtaposition of the $CO_2$ abstraction and the polymerization reactions to produce various foams.

FIG. 5 is an outline of manufacturing steps in the production of hydrophilic polyurethane.

FIG. 6 is a process flow diagram of atypical emulsification of a typical polyurethane prepolymer.

FIG. 7 illustrates a pin mixer used in the emulsification of polyurethane prepolymer.

FIG. 8 is a flow diagram of process to manufacture the foam composite by the emulsion process.

FIG. 9 is a graph illustrating the reduction of viscosity with increasing temperature.

FIG. 10 is a flow diagram of the process to manufacture the foam composite by the solvent process.

FIG. 11 is a flow diagram of the process to manufacture the foam composite by the direct cast process.

FIG. 12 is a schematic view of an embodiment in which the foam composite is utilized in a device for soil-less growing media.

FIG. 13 is a schematic view of an embodiment in which the foam composite is utilized in a controlled release device.

FIG. 14 is a schematic view of an embodiment in which the foam composite is utilized in a cell for bioremediation.

FIG. 15 is a schematic view of an embodiment in which the foam composite is utilized in a fermentation device.

FIG. 16 is a schematic view of an embodiment in which the foam composite is utilized in a device for the treatment of milk.

FIG. 17 is a schematic view of an embodiment in which the foam composite is utilized in an enzymatic reactor.

FIG. 18 is a schematic view of an embodiment in which the foam composite is utilized in a device used in a femoral shunt.

FIG. 19 is a schematic view of an embodiment in which the foam composite is utilized as a scaffold for the propagation of living cells.

FIG. 20 is a schematic view of an embodiment in which the foam composite is utilized in the drug delivery system.

FIG. 21 is a schematic view of an embodiment in which the foam composite is utilized in an adsorption cell.

FIG. 22 is a schematic view of an embodiment in which the foam composite is utilized in a device used for the removal of drugs from blood.

FIG. 23 is a schematic view of an embodiment in which the foam composite is utilized in a device used to deionize water.

FIG. 24 is a schematic view of an embodiment in which the foam composite is utilized in a humidifier for incubators.

FIG. 25 is a schematic view of an embodiment in which the foam composite is utilized in a humidifier for anesthetics.

FIG. 26 is a schematic view of an embodiment in which the foam composite is utilized in a device used for administering anesthetic.

FIG. 27 is a schematic view of an embodiment in which the foam composite is utilized in a device used for drying hydrocarbons.

FIG. 28 is a schematic view of an embodiment in which the foam composite is utilized in a respirator.

FIG. 29 is a schematic view of an embodiment in which the foam composite is utilized as a flow-through analytical column for multiple sequential analysis.

FIG. 30 is an illustration of a column packed with the foam composite of the invention used to determine the relationship of flow rate and pressure drop.

FIG. 31 is a graph illustrating the relationship between flow rate and pressure drop across hydrophobic polyurethane.

FIG. 32 is a graph illustrating the relationship between flow rate and a ratio of the weight of hydrophilic polyurethane to the weight hydrophobic polyurethane in foam composites of the invention.

FIG. 33 is a graph illustrating the relationship between the content of polyurethane prepolymer in solution and the ratio of the weight of hydrophilic polyurethane to the weight of hydrophobic polyurethane.

FIG. 34 is a graph illustrating the effect of temperature on the foam composites of examples 11–15.

DETAILED DESCRIPTION OF THE INVENTION

Definitions

Figure 35:
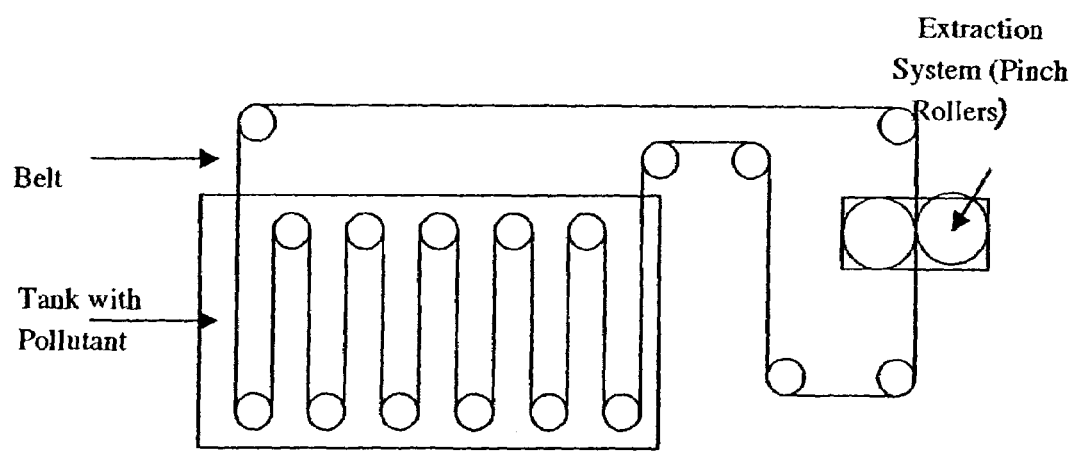
FIG. 35 is a schematic representation of an apparatus using the composites of the invention to continuously remove biomass from waste streams containing pollutants or to extract components from a liquid.

The term "reticulated hydrophobic polyurethane foam" refers to a polyurethane foam having a mesh like structure that does not readily absorb water. This term is defined further below.

The term "open cell, hydrophilic polyurethane form" refers to a highly flexible polyurethane foam that absorbs water readily. This term is more specifically defined further below.

The term "curing" refers to the conversion of a raw product to a finished and useful condition by application of water for a period of time sufficient to induce physicochemical changes. This term is more specifically defined below.

The term "surface area" refers to the total surface area of a substance measurable by the BET technique.

The term "functional group" refers to groups of atoms that give the composite or substance to which they are linked characteristic chemical and physical properties.

A "functionalized" surface refers to a surface on which chemical groups are absorbed or chemically attached.

The term "bioaffecting or active agent" refers to an additive that is a biological entity or produces an effect upon a biological entity or acts upon a biological entity so as to effect a response therefrom.

The term "non-bioactive ingredient" refers to an additive other than bioaffecting agents.

Detailed Description

The invention relates broadly to composites comprising open cell hydrophobic polyurethane foams and open cell hydrophilic foams. The cells in the hydrophobic foams may vary in their degree of openness. Hydrophobic foams useful in the practice of the invention include those having a reticulated or substantially reticulated cell structure as well as those having an open-cell non-reticulated structure. Hydrophobic foams having an open cell, non-reticulated structure lend themselves to applications in which absorbency is particularly important. Hydrophobic foams having a more open, reticulated structure lend themselves to applications in which a gas or liquid is passed through the structure, as in a filter, and where fluid flow and pressure drop considerations are of particular importance.

In the following description the terms open cell, reticulated or substantially reticulated may be used to characterize the open cell structure of the hydrophobic foam. It will be understood that these terms may in contexts be used interchangeably and are not meant to limit the scope o the invention.

Referring first to FIG. 1, the foam composite 10 is shown. The hydrophobic polyurethane foam forms a reticulated scaffold 12. The hydrophobic foam scaffold 12 forms a backbone for an open cell foam coating 14, such as open cell hydrophilic polyurethane. The hydrophobic polyurethane foam scaffold 12 is typically a reticulated foam made from water insoluble polyester or polyether backbones and diisocyanates as caps to the polyols. Other ingredients, such as surfactants and catalysts, may be added to aid production. Only small amounts of water are added as a necessary component of the chemistry. The reticulated foams useful in the present invention are typically produced by the so-called "one-shot" process wherein all of the ingredients are mixed in a single step to produce the final foam product. Using heat and pressure in specially designed vessels, a flexible skeletal foam structure without cell membranes is produced.

The open-pore structure can be produced in a range of precisely controlled pore sizes that contain void volumes of up to 98% and surface areas of up to 2000 $ft^2/ft^3$. Various pore sizes, typically from 4 to 100 pores per linear inch (ppi) enable the use of the hydrophobic polyurethane in specific applications. The high porosity of this material also helps control permeability and adds to design flexibility.

Among the benefits of reticulated hydrophobic polyurethane foams are easy fabrication and chemical resistance. Such reticulated foams also exhibit high tensile strength, elongation and tear properties that allow such fabrication techniques as cutting, shaping, stapling, tacking, stitching, cementing, laminating and grommeting. The reticulated hydrophobic polyurethane is supplied in sheets, rolls, diecuts, and complex compound shapes. Hydrophobic polyurethane foams which have been found suitable for use in the foam composite of the present invention include without limitation those marketed under the trademarks Crest Foam and FoamEx. These products are commercially available from Crest Foam, Moonachie, N.J., USA and FoamEx, Eddystone, Pa., USA.

There are many commercial applications for reticulated hydrophobic polyurethane foams. Generally, these applications are based on properties such as the unusual physical strength of the hydrophobic foam, controlled pore size, and surface area.

Table 1 below summarizes the physical properties of hydrophobic polyurethane foams useful in the present invention. The information set forth in Table 1 below was obtained based on tests conducted according to ASTM 3574-91 on hydrophobic polyurethane foams from Crest® foam.

TABLE 1

Physical Properties of Reticulated Foams

| Property | S-10 | S-40 | S-90 |
|---|---|---|---|
| Pores/Linear Inch | 10.0 | 40.0 | 90.0 |
| Density lb/$ft^3$ | 1.9 | 1.9 | 1.9 |
| 25% Compression Load Deflection psi | 0.5 | 0.5 | 0.5 |
| Tensile Strength psi | 16.0 | 20.0 | 30.0 |
| Elongation % | 180.0 | 160.0 | 240.0 |
| Tear Strength lb/in | 4.0 | 4.0 | 3.5 |
| Compression Set @ 50% Deflection psi | 15.0 | 15.0 | 15.0 |
| Air Flow cfm | 25.0 | 14.0 | 4.0 |

The pressure drop of hydrophobic reticulated foam of various pore sizes is shown in FIG. 2 at 575 ft/min. of dry air through 1 $ft^2$ of 1 inch thick foam. The surface area of a hydrophobic reticulated foam is seen as a function of pore size in FIG. 3.

The chemistry of making open cell hydrophobic polyurethane foams is described as being an isocyanate-capped polyether polyol and is discussed in more detail further below. Prepolymers made of this chemistry which are suitable for the present invention are described in U.S. Pat. Nos. 3,903,232 and 4,137,200 both to Wood, et al. incorporated herein by reference as if set forth in full. The isocyanate-capped polyol is known in the industry as a prepolymer or a quasipolymer.

Isocyanates suitable for this invention are aromatic, such as, for example, toluene diisocyanate (TDI) or methylene diphenyl isocyanate (MDI), or with a aliphatic diisosyanate, such as hydrogenated MDI or isopherone diisocyanate. Isocyanates and polyols useful in making the open cell hydrophilic polyurethane foam for use in the foam composite of the invention are described in U.S. Pat. Nos. 5,064,653 and 5,065,752 both to Session, et al. incorporated herein by reference as if set forth in full. Polyether polyols are homopolymers of ethylene oxide, also known as polyethylene glycols, or copolymers of ethylene oxide and propylene oxides.

The value of this class of prepolymers is based on its compatibility with water. It is the ability to be emulsified with large amounts of water that forms the basis for the value of these prepolymers. Within the water compatible components can be included a wide variety of other materials. Among those are mineral fillers that are used to affect the compression characteristics of the foam. Peat moss can be added to foam to form the basis of a high value soil-less growing medium. While fillers can be added, they are not necessary. At the other end of the spectrum is the inclusion of a simple emulsifying agent. The result is a low extractable, biocompatible material useful for a wide variety of medical products. The ability to incorporate other materials in hydrophilic polyurethane foam offers the product designer a material that has functionality greater than its physical characteristics.

This flexibility comes at a price. The physical strength of hydrophobic polyurethane is low. The wet tensile strength of open cell hydrophilic polyurethane is only about 4 psi which is significantly lower than the tensile strength of hydrophobic polyurethane. The reaction to form hydrophilic polyurethane utilizes large amounts of water and results in a relatively high density and poor cell size control. The compressive strength of the polymer product is also low. In some applications, this is a positive characteristic since products made from this material are soft and have a pleasant feel. However, this is an undesirable characteristic for many industrial applications.

The physical characteristics of open-cell hydrophilic polyurethane foam are summarized in Table 2.

TABLE 2

Physical Properties of Hydrophilic Polyurethane Foams[1]

| Property | |
|---|---|
| Pores/Linear Inch | 200.0 |
| Density, lb/ft$^3$ | 6.0 |
| 25% Compression Load Deflection, psi | 0.1 |
| Tensile Strength, psi | 4.0 |
| Elongation % | 300.0 |
| Tear Strength, lb/in | 2.0 |
| Compression Set @ 50% Deflection, psi | 2.0 |
| Air Flow cfm @ 0.5 ΔP | 0.2 |

[1]Medical Grade

The above properties are for single component polymer systems, but other compositions are also possible. Trudell, et al. teach in U.S. Pat. No. 5,207,705 a collagen polyurethane foam blend that is useful as a biocompatible surface for human cell propagation. This system is within the scope of this invention. The collagen is added to an aqueous phase. It is then emulsified with a hydrophilic polyurethane prepolymer and applied to the scaffold as described within.

Once the open cell coating polyurethane is formed, it can be post treated by grafting ligands onto its surface thereby forming a functionalized surface. In one embodiment of the present invention, acrylic acid can be grafted onto the surface of an unsaturated hydrophilic polyurethane coated scaffold using a grafting process for hydrophilic polyurethane described by Mekras, C. L., et al., *Immobilization of alpha-chymotrypsin on poly (urethane graft-acrylic acid)*, Int. J.Biol. Macromol, 1989 vol. 11 No. 2, pp. 113–118 incorporated herein by reference. The graft was prepared using 2,2'-azo-bis-isobutyronitrile as a radical initiator and acrylic acid as the monomer.

In another embodiment of the invention, a polyurethane polymer was treated with hydrogenated methylene diphenyl-isocyanate and then with human serum albumin to produce a grafted albumin surface. Such treated polymers is reported by Rye, G. et al. to have unique blood compatibility characteristics.

Prepolymers suitable for use in the present invention are isocyanate-capped polyether prepolymers with an NCO functionality of greater than 5% as more particularly described below. The prepolymers are based on polyether polyols capped with aromatic isocyanates such as for example toluene diisocyanate (TDI) or methylene diphenyl isocyanate (MDI) or with aliphatic isocyanates, such as, for example isopherone diisocyanate (IPDI) or hydrogenated methylene diphenyl isocyanate (HMDI). The polyether polyols are hydrophilic polyoxyalkylenes with a minimum of 40 mole % ethylene oxide. Crosslinking sites are developed, when necessary, during the prepolymer formation by using the techniques described in Saunders, J. H., et al., *Polyurethanes, Chemistry and Technology. Part II*, Interscience Publishers, New York The method of analysis is described in *Analytical Chemistry of he Polyurethanes*, Robert E. Krieger Publishing Company, Huntington, N.Y. 1979 pp357–359 incorporated herein by reference. These techniques are as follows:

1. The addition of water to the prepolymer polyols to form urea and subsequently biuret linkages in the prepolymer;
2. The formation of allophanate linkages by prolonged heating at elevated temperatures;
3. The branching of prepolymers by the addition of triols or tetrols, such as for example, trimethylolpropane, glycerol, or pentaerythritol;
4. The formation of branches by the use of selective catalysts.

Isocyanate-capped polyether prepolymers which have been found to be suitable for use in the practice of the present invention include without limitation prepolymers commercially available from the following companies: Lendell Manufacturing, St. Charles, Mich., U.S.A.; Rynel Ltd. Inc. Boothbay, Me., U.S.A; Dow Chemical, Midland, Mich., U.S.A.; and Mace Adhesives and Coatings, Dudley, Mass., U.S.A. Table 3 below lists polyurethane prepolymers of these companies and the NCO functionality content of their respective prepolymers.

TABLE 3

| Rynel Prepolymer Type | % NCO |
|---|---|
| B-1 | 7.4–8.32 |
| A-62 | 10.0–11.4 |
| Trepol | 5.2–6.4 |

TABLE 3-continued

| | % NCO |
|---|---|
| Mace Adhesives & Coatings | |
| Bipol | 5.5–6.5 |
| Dow Chemical | |
| Hypol 2000 | 6.3–7.2 |
| Hypol 2002 | 6.3–7.2 |
| Hypol 3000 | 9.5–10.3 |
| Hypol 5000 | 9.5–11.13 |
| Lendell Manufacturing | |
| Prepol | 8.0–8.5 |

The method of analysis of the NCO functionality is described in *Analytical Chemistry of Polyurethanes*, Robert E. Krieger Publishing Company, Huntington, N.Y. (1979).

Unlike the process used to make hydrophobic polyurethanes, hydrophilic polyurethanes are preferably made by the so-called pre-polymer or pseudo pre-polymer method. In this technique, the polyol and the isocyanate are reacted in various ratios and by various reaction schemes to produce an intermediate product called a pre-polymer or quasi pre-polymer. This is then emulsified in an aqueous phase to produce the final foam product 14.

The isocyanate end groups on prepolymer molecules are reactive to any compound with an active hydrogen. Thus if a prepolymer is mixed with an alcohol or an amine, a reaction takes place that essentially caps the prepolymer and terminates the reaction as shown below:

If the alcohol or amine is difunctional (that is having an amine or alcohol group at two positions on the molecule) it will continue to react with other isocyanate end groups. The result of this process is a continuous building of molecular weight until the isocyanate groups or the other reactants are consumed. This is the basis of the elastomer technology, applicable not only to hydrophilic polyurethanes but also to all polyurethanes. This reaction is used to obtain coatings for fabric, leathers and many other surfaces. When practiced to produce hydrophilic polyurethanes a film with a very high water vapor transmission rate is obtained. When applied to a fabric such as a continuous film, it is said to have high breathability. It has the typical disadvantages of hydrophilic polyurethanes in that it is physically weak and swells upon the addition of moisture.

There are a variety of amines that are used for this purpose. Each adds it own physical properties to the resultant film. The molecular weight, molecular structure, and the hydrophilicity of the amine contribute to the properties of the resultant film.

The reaction with amines is typically very fast relative to the reaction with water.

If the prepolymer has little or no crosslinking, the resultant elastomer can be thermo-plastic. With crosslinking, however, the film can develop significant strength.

If a chain-terminating component is added to the elastomer reaction, the molecular weight of the film can be limited to remain within the adhesive boundaries.

Thus by the proper control of the reaction conditions, a high moisture vapor transmissive adhesive film can be produced.

The reaction of primary interest, however, is the reaction of a hydrophilic prepolymer with water as shown below:

In this reaction, the production of $CO_2$ and an amine proceed simultaneously to develop, ultimately a stable foam. This is the core reaction of hydrophilic polyurethane foam technology.

The amine product of the reaction develops the physical strength of the foam composite by polymerization to contain the evolution of the $CO_2$. As a result of the $CO_2$ evolution, a radical change in the rheology of the reacting mass takes place early in the process.

Once the water and the prepolymer are mixed, the rheology of the emulsion is that of a liquid. If it remained a liquid, the $CO_2$ would be able to escape the emulsion and the result would be a closed cell, high density foam of little commercial interest. Commercially available prepolymers have a significant degree of crosslinking and thus, soon after the reaction is initiated, the emulsion changes its rheology from a true liquid to a gel. It is part of the design requirements of a commercial prepolymer that there be sufficient crosslinking to rapidly develop enough gel strength to withstand the internal pressures developed by the evolving $CO_2$.

Since the evolution of $CO_2$ and the polymerization are two separate reactions, each with its own activation energy, a change in temperature affects the rate of the reaction to a different degree. For instance, an increase in temperature, even a few degrees, accelerates the $CO_2$ reaction more than it accelerates the amine reaction. In as much it is the amine that produces the gelling of the mass, the $CO_2$ evolves, at first, in a liquid environment and, even if the emulsion has gelled, the $CO_2$ internal pressure may exceed the ability of the gel to contain it. As a result, the foam may expand initially, but the emulsion will reach a point where it will visibly collapse. This can be used to advantage if a high density hydrophilic polyurethane is required, but typically this is not desired.

Alternatively, if the temperature is lowered, the strength of the gel increases faster relative to the rate of evolution of $CO_2$. However, the $CO_2$ reaction must take place first to produce the amine. Lowering the temperature has the effect of decreasing the difference in reaction rates. From a practical point of view, the gel strength develops so as to be able to withstand the internal pressures. This is evidenced by a slower rate of rise and the result is a higher density product. In the extreme, a closed cell foam is produced. An efficient process must juxtapose these reactions so as to produce the desired product as illustrated graphically in the FIG. 4.

Accordingly, the control of temperature is a critical process parameter. An efficient process will focus the control efforts on the temperatures of the components, the degree to which the two phases are emulsified and other classical control methods. Once the emulsion is made and dispensed, there is little that can be done to control what happens. In this sense, the process changes to a more or less chaotic condition. From a control point of view, every thing that can be done to moderate the process must be done before or during the emulsion stage.

The flow diagram shown in FIG. 5 is common to most if not all hydrophilic polyurethane foam manufacturing processes.

The preparation refers to the treatment of the prepolymer and the aqueous phases before they are pumped into an emulsifier. This is typically tempering them with respect to temperature. This usually done in a jacketed vessel.

A prepolymer tank is closed and is usually blanketed with dry nitrogen to prevent reaction with the humidity in the air. Inasmuch as the prepolymer is a high viscosity liquid at room temperature, the prepolymer temperature can be raised to between 80° F. and 100° F. This lowers the viscosity of the prepolymer enough to be pumped without fear of cavitating the pump. As a final control of the temperature it is typically pumped through a heat exchanger designed to ensure that the temperature of the prepolymer is controlled to within 1° F. of a set point. If a temperature above room temperature is used, heated lines are recommended. Delivery of the prepolymer to the mixer is typically accomplished by using a gear pump. These are positive displacement devices, which ensure a precisely controlled volume of material is delivered to the emulsifier. Care must be taken, however, that an uninterrupted flow of prepolymer to the pump on the low pressure side is maintained. Attempting to pump liquid faster than the prepolymer can flow into it results in cavitation which changes the flow rates and can gel the prepolymer. FIG. 6 shows a typical prepolymer process flow diagram.

The preparation of the aqueous stream is similar. Due to the usually lower viscosity of the aqueous stream, a gear pump is not recommended. A progressive cavity pump, such as a Moyno-type, is preferred. A consideration in the choice of pumps is the components of the aqueous phase. If the aqueous phase contains a solid, as in a slurry or emulsion, a Moyno-type pump is highly preferred. When using latices, the shear forces created by the pump can coagulate the fluid.

Typically, the temperature of the aqueous stream is used to adjust the quality of the foam. For instance, if a foam is found to have large cells and a low density, the temperature of the aqueous stream might be lowered. Thus the aqueous temperature can be viewed as a primary means to fine-tune the process of preparing open-cell hydrophilic polyurethanes. Other control methods exist, such as adjusting the emulsifier speed, but controlling the temperature of the aqueous phase is the more convenient method.

As with the prepolymer stream, the important parameters of the aqueous stream are temperature and flow rate. Any pump system that meet these parameters will be effective. Pulsatory pumps, such as peristaltic, piston, diaphragm, and the like should be avoided, but can be made to work if a pulse-reducing chamber or coil is used. Depending on the nature of the aqueous stream, continuous agitation might be required.

With those exceptions, a process flow scheme of the aqueous stream would be similar to that for the prepolymer flow diagram shown in FIG. 6.

In both cases, the prepolymer and the aqueous streams must be engineered in such a way as to deliver safely both streams to the emulsifier at a precise flow rate and a precise temperature. The absolute values are determined by a number of process specific requirements, but the ratio of aqueous to prepolymer should be controlled to within 1% preferably to within 0.5% and the temperatures should be controlled to within 1.0° F. and preferably 0.5° F.

The next step in producing an open cell hydrophilic polyurethane foam for use in the invention is the emulsification of the prepolymer and aqueous phases. The device that performs this operation is typically called the mix head. There is a wide variety of equipment whose purpose is to produce the emulsion. The preferred designs fall into the category of what are called pin mixers. FIG. 7 shows a typical design of a pin mixer. Although not shown in FIG. 7, the mixer can have what are called stators. These are pins attached to the walls of the mix head and, therefore, they do not spin. These stators increase the turbulence inside the mixhead.

What results, typically, is a prepolymer in water emulsion, i.e., with water as the continuous phase. Inasmuch as this is essentially the last stage in which we can control the quality of the foam, there are a number of variables to be discussed.

The temperature is of critical importance to a well-controlled process. For the most part, it is the temperature of the emulsion leaving the mix head which is of principal concern. This is essentially determined by the temperatures of the component parts, but in the context that a few degrees can be significant, the mix head itself can have an effect on the emulsion. Depending on the speed at which the mixer spins, it can add 2–3° F. to the emulsion.

It is the function of the mixhead, however, to create an emulsion. It is the quality of the emulsion that, for the most part, defines the cell structure of the resultant foam. Emulsions of very small droplet sizes will result in a small-celled foam, all other things being equal. Emulsions with a broad droplet size distribution will have a wide variety of cells in the foam.

The primary determinant of the size and distribution of the emulsion and the cell structure of the foam is the use of an appropriate emulsifier.

The rate at which the foam absorbs water is known by several names, but the most common is wicking. A fast wicking foam will begin to absorb as soon as it is placed in water. Values of less than a second are usually reported as "<1 second". This can be an important technical factor and needs to be given attention during design of the open cell hydrophilic polyurethane useful in the present invention. The control of wicking is strictly a function of the emulsifier package that is used. The hydrophilic polyurethane foam itself has very slow wicking values (>5 minutes). If a water-soluble surfactant is used, such as Pluronic F-68, Tween 20, and the like, the wicking will be greatly increased. If a waxy surfactant such as Brij 72, for example, is used the wicking will not be increased as much.

The NCO concentration of prepolymers is a measure of the amount of $CO_2$ that can be generated upon the addition of water. Inasmuch as it is the $CO_2$ that creates the foam structure, the higher the percentage of NCO the more foaming takes place. At concentrations above 1%, enough $CO_2$ is generated not only to produce a foam but also to develop enough internal pressure to break the "windows" between developing cells of the resulting hydrophilic polyurethane. This is the origin of the open cell structure that is an essential aspect of this invention. At concentrations below approximately 1%, a dense, closed cell mass is made. On the other hand, at concentrations above 14% so much $CO_2$ is generated that the gas is able to break through the surface thus liberating so much of the $CO_2$ that the foam collapses. This effect is also seen if the temperature is too high, for instance above 120° F. The range of NCO values for the prepolymers useful in the present invention is from about 5% to about 15% by weight. In a preferred embodiment of this invention in order for the prepolymer to contain sufficient NCO to develop a preferred open-cell foam structure a range from about 6% to about 9% by weight is recommended.

The foam composite of the present invention is provided by applying an open cell hydrophilic polyurethane foam coating to a reticulated hydrophobic polyurethane foam according to the processes discussed below. By combining these two types of foams, the resulting composite overcomes the disadvantages of both hydrophobic and hydrophilic polyurethane while maintaining their respective advantages.

Specifically, a hydrophilic coating, which may or may not contain an active ingredient, provides for the hydrophilic character, while the reticulated foam provides for physical strength and the good flow-through aspects that characterize a reticulated foam. Thus, while the hydrophilic coating will swell when it absorbs water, the reticulated foam is sufficiently strong to prevent an increase in the size of the composite.

The resulting foam composite of the present invention has a density from about 0.03 g/cc to about 0.10 g/cc. Its pore size distribution varies from about 8 pores per linear inch (ppi) to about 100 ppi. In a preferred embodiment the pore size distribution is from about 10 ppi to about 45 ppi, where the ratio of the weight of the open cell hydrophilic polyurethane coating to the weight of the hydrophobic foam is from about 0.01 to about 15, and preferably from about 0.5 to about 10 depending upon the application for which the foam composite has been engineered. The surface area of the foam composite of the invention varies from about 100 $ft^2/ft^3$ to about 2000 $ft^2/ft^3$ and preferably from about 300 $ft^2/ft^3$ to about 2000 $ft^2/ft^3$.

The absorbency characteristic of the foam composite of the present invention depends upon the amount of the open cell hydrophilic polyurethane coating.

Flow characteristics of the foam composites of the invention have been examined as a function of pore size and amount of open cell hydrophilic foam applied to the reticulated foam structure. It has been found that the smaller the cell size of the foam composite the higher the pressure drop at any given flow. For example, a foam composite having a cross sectional area of approximately 2 $in^2$ and the thickness of approximately 7 inches, a pore size of about 10 ppi and a weight ratio of hydrophilic to hydrophobic polyurethane of 1.1 exhibits a pressure drop of water passing through it from about 0.06 psi to about 1.25 psi at flow rates from approximately 1 to approximately 5 gal/min. A foam composite having the same cross sectional area and thickness and a pore size of 10 ppi, but an increased weight ratio of hydrophilic to hydrophobic polyurethane of approximately 2.6 exhibits a pressure drop from about 0.06 psi to about 1 psi at flow rates from about 1 to about 3 gal/min.

The foam composite of the present invention is also very durable. In one study, the foam composite of the invention was used to remove water from a hydrocarbon fluid. A column of foam composite having a diameter of 4 inches and a thickness of 12 inches was placed in a cartridge and a quantity of 10 gallons per minute of the hydrocarbon fluid was pumped through it for 60 minutes without damage to the foam composite.

The durability of the coating is further demonstrated in a study of the hydration/dry cycle. A sample of foam composite consisting of 10 grams of reticulated foam of Crest T-20 coated with 6 grams of an open cell hydrophilic foam made from Lendell PrePol® prepolymer by the emulsion process, as described in Example 1 herein, was immersed in water at ambient temperature for 30 minutes to hydrate it fully. It was then removed and dried at 105° C. until the foam composite achieved constant weight. It was rehydrated and dried by this process 10 times. No flaking of the hydrophilic foam coating was observed at any time. Table 4 below shows the data:

TABLE 4

Rehydration of Foam Composite

| Times Hydrated and Dried | Total Weight Dry (grams) |
|---|---|
| 1 | 16.1 |
| 3 | 16.1 |
| 5 | 16.3 |

TABLE 4-continued

Rehydration of Foam Composite

| Times Hydrated and Dried | Total Weight Dry (grams) |
|---|---|
| 7 | 16.1 |
| 10 | 16.1 |

This experiment demonstrates the durability of the foam composites of the invention as evidenced by their ability to be fully dried and yet not flake off.

Without being bound by theory, it is believed that the durability of the foam composites of the present invention is due in part to the strong bonding existing between the open cell hydrophilic polyurethane coating and the reticulated hydrophobic scaffold.

In another preferred embodiment of the present invention, the absorption capability of the foam composite of the present invention is enhanced by contacting the hydrophobic polyurethane scaffold with a mixture of a prepolymer emulsion of the open cell hydrophilic polyurethane and a hydrophilic hydrogel emulsion. Useful hydrophilic hydrogels for this embodiment of the invention include without limitation those based on polysaccharides and acrylics. Polysaccharide hydrogels useful in the invention include without limitation alginate, carrageenan, agar, agarose, curdlan, pullulan, gellan and the like. Acrylic hydrogels useful in the invention include, without limitation, polyacrylamide, poly (ethyl methacrylate), poly (glycol methacrylate), poly (hyroxy methyl acrylate), poly (sodium acrylate), mixtures thereof and the like. The hydrophilic polyurethane prepolymer and the hydrophilic hydrogel are preferably in a ratio from about 0.01 to about 10.0 and preferably from about 1.0 to about 5.0 of hydrogel to hydrophilic polyurethane foam. The mixed emulsion containing hydrophilic hydrogel and hydrophilic polyurethane prepolymer when reacted in place becomes firmly bound to the hydrophobic polyurethane scaffold.

According to one embodiment of the invention, a foam composite is provided by contacting a prepolymer emulsion of hydrophilic polyurethane with a reticulated hydrophobic polyurethane scaffold. The contacting of the prepolymer emulsion with the reticulated hydrophobic polyurethane scaffold can be accomplished in anyway available to one skilled in the art. Examples of contacting include, without limitation, dipping of the scaffold into a prepolymer bath, coating of the reticulated scaffold with the prepolymer emulsion by distributing it with a rolling pin, spraying the prepolymer emulsion over the reticulated scaffold and the like.

The contacting step is followed by curing the emulsion impregnated reticulated hydrophobic polyurethane for a period of time sufficient to form the foam composite. Prior to curing, the emulsion impregnated reticulated foam can, optionally, be subjected to a stream of air blowing through the curing composite. This minimizes the formation of windows across cells to ensure that the reticulated structure of the foam composite is uniformly retained. A flow diagram showing the emulsion process is shown in FIG. 8.

Curing the prepolymer emulsion impregnated hydrophobic polyurethane is accomplished by allowing it to age undisturbed for a period of time sufficient for approximately 99% of the isocyanate functionality to have reacted with the water. Generally, the amount of time necessary for curing to take place varies from about 10 minutes to about 30 minutes depending upon the temperature of the water and the curing chamber which is typically from 20° C. to about 30° C. The curing step is ordinarily followed by an optional drying step during which any excess water present in the foam composite is driven off.

The amount of prepolymer in the emulsion used to prepare the hydrophilic foam composition is not particularly critical, but depends on a number of factors including the temperature and pore size of the reticulated foam to be coated. A ratio range of from about 0.8:1 to about 2.2:1 of aqueous phase to prepolymer phase is typical, with a ratio range of from about 1:1 to about 2:1 being preferred. The higher ratios, which typically result in lower viscosity, are preferred for smaller pore sizes. Lower ratios are preferred for larger pore sizes. Prepolymer emulsions of higher viscosities typical of lower ratios are used when higher coating weights are desired.

High ratios are also preferred when the temperature of the emulsion needs to be limited. This is the case when enzymes, bacteria or other components that are temperature sensitive are included in the emulsion.

The temperature of the emulsion used to prepare the hydrophilic foam composition is important for two reasons. First, as indicated above, temperature sensitive components in the emulsion may have to be protected by using low temperature components, i.e., a aqueous phase and prepolymer phase and minimizing the exotherm that is the natural result of the reaction of water and the prepolymer.

Secondly, the temperature is important in controlling the gel time of the emulsion. This point in the reaction, known in the industry as cream time is the point at which the reacting emulsion changes from a liquid to a gel. Gelation is an important step in the development of the polyurethane foam structure. It is an essential aspect of the present invention that the emulsion be cast onto the structure of the reticulated foam before gelation. Those skilled in the art of prepolymer emulsions will understand that gelation is a separate step for curing. During gelation only approximately up to 10% of the isocyanate functionalities present in the emulsion react primarily with other isocyanate functionalities.

The range of temperatures used in the practice of this invention is from about 4° to about 50° C., and preferably from about 15° to about 40° C.

A wetting agent is typically included in the emulsion to provide for more uniform wetting of the resultant foam. The wetting agent also aids in controlling the cell size of the foam. Wetting agents suitable for use include non-ionic surfactants. Examples of materials that are useful in the present invention include but are not limited to block copolymers of ethylene oxide and propylene oxide sold by BASF Wyandotte Corporation of Parsippany, N.J., USA under the trade name Pluronic®. Pluronic L-62 and F-88 available from BASF Wyandotte Corporation are preferred. Pluronic F-88 is suitable and has been used in medical devices due to its biocompatibility. Generally the amount of wetting agent should be from about 0.01 to about 1.0% based on the weight of the aqueous phase. A preferred amount of wetting agent is 0.05–0.5% by weight.

In another embodiment, the foam composite of the invention is made by a process wherein the reticulated hydrophobic polyurethane foam is prepared by contacting with a solution of a prepolymer in a nonreactive solvent. Useful nonreactive solvents for the solvent process of the invention include solvents that are found to dissolve the prepolymer without reacting with it within the time required for deposition on the reticulated foam. Such solvents include without limitation acetone, toluene, xylene, benzene, mixtures thereof or the like. As in the emulsion process, the contacting may be accomplished by coating, spraying or dipping the reticulated scaffold into the prepolymer solution. The coated or otherwise prepolymer impregnated reticulated hydrophobic polyurethane is squeezed or hung in place to remove the excess prepolymer solution.

The critical step in this process is to reduce the viscosity of the prepolymer solution. A non-reactive solvent is used to dissolve the prepolymer and thus lower the viscosity of the prepolymer coating. The degree to which the viscosity is lowered will control the amount of prepolymer that is deposited on the reticulated scaffold.

The solvent may be evaporated or recovered for further use. Just as in the emulsion process, there must be a curing step of the reticulated scaffold coated with the prepolymer solution for the foam composite of the present invention to be formed. Curing can take place in a water bath or in a high humidity chamber. The temperature of the water bath can be from about 4° C. to about 50° C., and is preferably in the range of 20° C. to 40° C. The curing time is generally from about 10 minutes to about 30 minutes. As an alternative, a water vapor curing chamber can be used wherein the water vapor is kept typically at temperatures up to 95° F. and high relative humidity in excess of 95%. The residence time for curing in a water curing chamber varies from about 10 minutes to about 30 minutes. A flow diagram illustrating steps in the solvent process is shown in FIG. 10.

In yet another embodiment, the foam composite of the present invention is prepared by a direct cast process. As is the case with the solvent process, in the direct cast process the critical objective is to reduce the viscosity of the prepolymer coating.

In this process the reticulated hydrophilic polyurethane scaffold is contacted with the prepolymer directly where the viscosity of the prepolymer is controlled by increasing its temperature. Increasing the temperature reduces the viscosity. FIG. 9 illustrates the effect of temperature on the viscosity of lendell PrePol® prepolymer. Other prepolymer useful in the present invention have similar viscosity/temperature curves.

A flow diagram showing the direct cast process is shown in FIG. 11. It is readily apparent from FIG. 11 that the direct cast process has the same steps as the solvent process except that the prepolymer is not dissolved in any solvent and its viscosity is controlled by controlling the temperature of the prepolymer.

Curing can take place in a water bath or in a high humidity chamber as described above.

In another aspect of the invention, one or more additives may be incorporated in the hydrophilic polyurethane foam. The additives include bioaffecting or active agents and/or nonbioactive ingredients. Bioaffecting or active agents useful in the present invention include without limitation pharmaceuticals, fragrances, soaps, pesticides, herbicides, yeasts, bacteria, algi, enzymes, plants, animal cells, human cells, mixtures thereof and the like. Useful non-bioactive ingredients include without limitation hydrogels, fillers, activated charcoals, zeolites, ion exchange resins, phase change materials, mixtures thereof and the like.

In other preferred embodiments of the invention one or more additives can be incorporated in the foam composite. The incorporation of additives can be accomplished in any manner known in the art. In one preferred embodiment the additives are immobilized in the foam composite.

In another aspect of the invention bioaffecting agents such as, for example, antigens or ion exchange ligands are grafted onto the foam composite directly or they are grafted onto a hydrogel containing hydrophilic polyurethane coating. The grafting is accomplished by methods known in the art.

Inasmuch as the hydrophilic foam formulation can contain an active ingredient, the foam composite 10 can have a hydrophilic coating containing the active ingredient. In one example, the aqueous phase with which the hydrophilic prepolymer is emulsified may contain a fragrance. When combined with a reticulated foam 12, as described in the above example, a foam composite 10 with the fragrance imbedded in its structure results. Such a device might be used as a room freshener.

As set forth with reference to the attached drawings, the invention has many embodiments. Referring first to FIG. 12, one embodiment of the foam composite 10 contains plant growth media, such as peat moss, to produce a device for growing plants on a soil-less media. This can be used in hydroponics, for growth of high value plants, plants for transplant and plants for export, to name a few applications.

Another embodiment is shown in FIG. 13. As shown here, the foam composite 10 can be used as a controlled release device. In such an embodiment, the coated foam is formulated to include an additive, such as liquid soaps, fragrances, herbicides or pesticides. These additional components are released when a user uses the foam in a predetermine manner; i.e. mixing with water in the case of the soap, herbicides or pesticides, or evaporating into the air in the case of the fragrances.

Referring now to FIG. 14, in another embodiment of the invention, the foam composite 10 is formulated to include algae or bacteria to create a cell for bioremediation device. The hydrophilic foam 14 is prepared according to the procedures taught in Rao, K. K.; Hall, D. O. Trends Biotechnol. 1984. vol. 2, no. 5, pp. 124–129 and combined with the reticulated foam 12. In this embodiment, waste stream water or domestic water flows through the device, and becomes purified via through treatment by the algae or bacteria.

In another embodiment of the invention, the foam composite 10 is formulated with yeast to yield a fermentation device. The hydrophilic foam 14 is prepared according to the procedures taught in Lorenz, O.; Haulena, F.; Rose, G. Biotechnol. Bioeng. 1987. vol. 29, no. 3, pp. 388–391 and combined with the reticulated foam 12. As shown in FIG. 15, as sugar-containing water flows through the cell, the sugar is fermented, resulting in the production of alcohol.

Referring now to FIG. 16, in another embodiment of the invention, the foam composite 10 is formulated with a lactase enzyme which enzymatically converts whole milk into lactose-free milk. The hydrophilic foam 14 is prepared according to the procedures taught by Storey, K. B.; Chakrabarti, A. C. Appl.Biochem. Biotechnol. 1990. vol. 23, no. 2, pp. 139–154, and combined with the reticulated foam 12.

FIG. 17 shows another embodiment of the invention in which the foam composite 10 is formulated with immobilized enzymes or grafted to yield a flow through chemical reactor using enzymes or an ion exchange. Such an enzymatic reactor can be incorporated with any enzyme chosen by the user to perform the desired chemical reaction. In this embodiment, the hydrophilic foam 14 is prepared according to the procedures taught by Hu, Z. C.*; Korus, R. A.; Stormo, K. E. Appl. Microbiol. Biotechnol. 1993 vol. 39, no. 3, pp. 289–295, and combined with the reticulated foam 12.

FIG. 18 shows another embodiment of the present invention, in which the foam composite 10 is formulated to include antibodies specific for a particular antigen and is incorporated into a blood shunt such as a femoral shunt. The antibodies are incorporated into the hydrophilic polyurethane coating or are otherwise immobilized on the surface of the foam composite of the invention. The foam composite with the immobilized antibody is then placed in a device such as a canister to which blood from a living subject is fed using, for example, a femoral shunt. After the blood passes through the foam composite bearing device, it is returned to a major vein. In operation, as the blood passes through the foam composite filter, the antibodies immobilized on the surface of the foam composite complex with the antigen for which they are specific, capture the antigens and remove them from the blood. The device can be used to treat the blood of persons with drug overdoses, to remove HIV virus from the blood or to remove other environmental contaminants from the blood. Other antigens which could be separated by using specific antibodies immobilized in the foam composites of the present invention include, without limitations, HIV protease, components of HIV virus, opiates, such as, for example, codeine, cocaine, heroin, their $C_1$–$C_6$ analogs and the like.

Referring now to FIG. 19, another embodiment of the invention is a scaffold for the propagation of cells. This embodiment is created by seeding the foam composite 10 with hepatic or other human cells, as taught in Matsushita, T.; Ijima, H.; Koide, N.; Funatsu, K. Appl. Microbiol. Biotechnol. 1991. vol. 36, no. 3, pp. 324–326. The resulting embodiment can be used in the development of hybrid artificial organs or for other biomedical applications.

Another embodiment of the invention is shown in FIG. 20. In this embodiment, the foam composite 10 is formulated with a pharmaceutical agent of choice which yields a flow through device for administering pharmaceuticals. The hydrophilic foam 14 in this embodiment is produced by the emulsification of a hydrophilic prepolymer with a solution or dispersion of the pharmaceutical in water. This is then combined with reticulated foam 12. Fluid or blood is pumped into the apparatus, and the resulting fluid which comes out is fluid treated with the drug. This embodiment creates an advanced drug delivery system.

Referring now to FIG. 21, another embodiment of the invention is an adsorption cell for the removal of low concentration chemicals for bioremediation. Polyurethanes are known to adsorb organic molecules. (As described in Enkiri, F.; Hulen, C.; and Legault-Demare, J. Appl. Microbiol. Biotechnol. 1995 vol. 44, no. 3–4, pp. 539–545). This embodiment is created by producing a foam composite 10 by the method taught in the Example 1 described herein below. A process stream flowing through the cell is thus purified by the adsorption effect.

Another embodiment of the invention is shown in FIG. 22. In this embodiment, the foam composite 10 is formulated with a graft of activated charcoal or zeolite, and creates a device for the removal of drugs from blood.

Referring now to FIG. 23, another embodiment of the invention is a water deionizer. In this embodiment, the foam composite 10 is formulated with commercially available ion exchange is a resins or ligands attached to the surface of the foam composite 10 by grafting. The grafting is accomplished by procedures taught by Sreenivasan, K., Polymer Engineering and Science, v. 33 October '93 p. 1366–9. As water flows through the device, the water is de-ionized.

Related embodiments of the invention are shown in FIGS. 24 and 25. In these embodiments, the invention is used as a humidifier. As shown in FIG. 24, this device can be used as a humidifier for incubators. FIG. 25 shows the embodiment as a humidifier for dry anesthetics. In both FIGS. 24 and 25, the foam composite 10, prepared as described in the example 1 herein is wetted with water. The water then evaporates as a gas stream passes over it. This embodiment is not confined to just air and anesthetics, but other substances known in the art that require humidification.

As shown in FIG. 26, another embodiment of the invention is a device for administering anesthetic. In this embodiment, the foam composite 10 is formulated or post-treated with an anesthetic that evaporates in air flowing through the cell.

Another embodiment of the invention is shown in FIG. 27. In this embodiment, a device for removing water from a hydrocarbon is shown. The foam composite 10, due to the nature of its hydrophilic coating, will absorb water from the hydrocarbon stream passing through the cell.

Referring now to FIG. 28, another embodiment of the invention is shown in which the foam composite 10 is utilized as a respirator for use in low temperature applications. The hydrophilic foam 14 in this embodiment contains a phase change material that melts and freezes at just below the temperature of the human body (98.6° F./37° C.). The latent heat of fusion of the phase change material is used as a reservoir for storing the heat of exhaled air and subsequently releasing that heat to increase the temperature of inhaled air. Thus, in a respirator having two separate chambers and through which a person inhales through one chamber and exhales through the other, cold air enters the inhale side and is heated by the freezing phase change material. Air at body temperature is exhaled through the other chamber and melts the phase change material. This continues until the inhaled air freezes all of the phase change material. At that time, a valve is turned that reverses the inhale side to the exhale side and visa versa. The net effect is that the heat energy in the exhaled air is trapped and subsequently used to heat incoming air. The net effect is the breathed air temperature is tempered thus avoiding the body heat lost in very cold weather.

Referring now to FIG. 29, still another embodiment is shown in which the foam composite 10 is utilized as a flow-through analysis column. In such an embodiment, a column is made of one or more layers of foam 10, each providing an opportunity for analysis. For example, the first layer might be a foam 12 used for filtration. The second layer can be foam 12 coated with hydrophilic foam 14 to which an enzyme has been grafted (as described in Hu, Z. C.*; Korus, R. A.; Stormo, K. E., Appl. Microbiol. Biotehcnol. 1993 vol. 39, no. 3, pp. 289–295). The next layer might be a foam 12 coated with hydrophilic foam 14 to which an antigen that has been adsorbed or graphed. The device, thus constructed, is suitable for the analysis of one or more properties or constituents of a fluid passing through it.

The following examples have been carried out to illustrate the invention and to describe the best mode of the invention at the present time. These examples further illustrate the various features of the invention, and are not intended in any way to limit the scope of the invention which is defined in the appended claims.

EXAMPLES

Equipment

The equipment listed below has been used in the preparation of the foam composites of the invention. All materials used in these examples can be obtained from commercially available sources.

1. Meter/Mix

A series of devices whose function was to store, temper (with respect to temperature), meter (through the use of positive displacement pumps) and mix together the hydrophilic polyurethane prepolymer and aqueous phases component are employed. The system included heat exchangers by which the temperature of the phases were controlled. Meter/Mix systems are readily commercially available for use with hydrophilic prepolymers from Edge-Sweets & Co., Grand Rapids, Mich., USA.

2. Web

A system by which a continuous roll of reticulated foam is supplied to the process at a constant rate of speed. This equipment is typically custom made to meet the requirements of the manufacturing facility with respect to output.

3. Dip Tank

A tank or trough through which the reticulated foam web was drawn was employed in order to coat it with the prepolymer solution.

4. Nip Rollers/Doctor Blade

A device that distributes the emulsion across the surface of and causes the emulsion to penetrate into the structure of the reticulated foam.

5. Air Blow

A mechanism designed to blow air through the emulsion-coated reticulated foam in order to minimize the formation of windows across cells such that the reticulated structure of the foam composite is maintained. The use of this mechanism is optional.

6. Solvent Recovery

A mechanism for the evaporation and recovery of the solvent.

7. Immersion Curing Bath

Used in connection with a solvent or direct cast process, this equipment is a tank or trough through which the web was drawn to effect the curing of the foam composite by immersing it in water was employed. The residence time was sufficient to cure fully the foam composite of the invention.

8. Water Vapor Curing Chamber

Alternatively, the web of prepolymer solution coated hydrophobic polyurethane scaffold was drawn through a vapor curing chamber wherein the water vapor was typically kept at elevated temperatures of up to 95° F. and a high relative humidity in excess of 95%. The residence time of the web sufficient to complete curing of the foam composite.

9. Dryer

A mechanism to evaporate the excess water from the foam composite of the invention was employed. Radio frequency or hot-air dryers are typically used and are commercially available.

Example I

This example illustrates the preparation of foam composites by coating hydrophobic polyurethane scaffolds with an emulsion of polyurethane prepolymer.

Three (3) pieces of conventional hydrophobic reticulated foam having a pore size of 20 ppi such as Crest Foam, Grade S-20 were cut to 30.5 cm by 30.5 cm by 0.8 cm. Each weighed 16 grams. An emulsion was made using a mechanical mixer of a 0.1% Pluronic L62 (BASF Corp.) in water at ambient temperature and Rynel® (Grade B-1) hydrophilic polyurethane prepolymer (Rynel Ltd., Inc.). The emulsion was prepared by using 1 part prepolymer to 1.5 parts 0.1% Pluronic L62 solution. Three different amounts of the emulsion were immediately poured onto the three pieces of foam as shown in Table 5. In each case the entire emulsion was uniformly distributed onto the reticulated foam using a rolling pin. After curing, the entire amount of the prepolymer in the emulsion was found to form the coating of hydrophilic foam in the foam composite. The foam was allowed to cure in water for 30 minutes at ambient temperature and then dried at 105° C. The resulting foam composites were then dried and reweighed and then placed in water to measure how much water they would absorb. The following table presents the results of those tests:

TABLE 5

Physical Properties of Uncoated Versus Emulsion-Coated Reticulated Foams

| Foam Property | Reticulated | Emulsion 1 | Emulsion 2 | Emulsion 3 |
|---|---|---|---|---|
| Size | | | | |
| Length (cm) | 30.5 | 30.5 | 30.5 | 30.5 |
| Width (cm) | 30.5 | 30.5 | 30.5 | 30.5 |
| Thickness (cm) | 0.8 | 0.8 | 0.8 | 0.8 |
| Weight (grams) | 16.00 | 35.0* | 45.0* | 63.0* |
| Density (grams/cc) | 0.021 | 0.047 | 0.06 | 0.085 |
| Coating Thickness (grams) | — | 19.0 | 29.0 | 47.0 |
| Water Saturated Weight (grams) | 18.0 | 73.0 | 110.0 | 184.0 |
| Grams Water Absorbed per Gram of Foam | 0.125 | 1.09 | 1.44 | 1.92 |

*Total Weight of Foam Composite

In this example, the amount of water that each foam composite was able to absorb was used to evaluate the effectiveness of the process. The above results indicate that the absorption of the foam composite increased with increasing thickness of the hydrophilic polyurethane coating.

Example 2

This example illustrates the preparation of foam composites by coating reticulated hydrophobic polyurethane scaffolds with a solution of polyurethane prepolymer. A solution of the prepolymer was dissolved in a solvent such as acetone. The weight of the coating was controlled by varying the viscosity of the solution.

Three solutions of 10%, 20% and 30% of Rynel® prepolymer in acetone were prepared at ambient temperature. Samples of Crest® reticulated polyurethane foam as described in Example 1 above were dipped into the Rynel® prepolymer solutions. They were immediately removed and allowed to drain. They were then hung in a fume hood and the acetone was allowed to evaporate as evidenced by an absence of the acetone odor. The foam samples were then immersed in water at 25° C. for about 10 minutes to cure. The samples were then dried and reweighed. They were subsequently placed in water at 25° C. for 1 hour, patted dry to remove surface water and then reweighed to determine the absorbed amount of water. Table 6 below summarizes the results of these tests.

TABLE 6

Physical Properties of Uncoated Versus Reticulated Foams Coated with Prepolymer Solution

| Foam Property | Reticulated | 10% Polymer | 20% Polymer | 30% Polymer |
|---|---|---|---|---|
| Size | | | | |
| Length (cm) | 30.5 | 30.5 | 30.5 | 30.5 |
| Width (cm) | 30.5 | 30.5 | 30.5 | 30.5 |
| Thickness (cm) | 0.8 | 0.8 | 0.8 | 0.8 |

TABLE 6-continued

Physical Properties of Uncoated Versus Reticulated Foams Coated with Prepolymer Solution

| Foam Property | Reticulated | 10% Polymer | 20% Polymer | 30% Polymer |
|---|---|---|---|---|
| Weight (grams) | 16 | 19* | 23* | 27* |
| Density (grms/cm3) | 0.021 | 0.026 | 0.031 | 0.036 |
| Coating Thickness (grams) | — | 3.0 | 7.0 | 11.0 |
| Water Saturated Weight (grams) | — | 18.0 | 26.0 | 43.0 |
| Grams Water Absorbed per Gram of Foam | — | 0.125 | 0.37 | 0.87 |

*Total Weight of Foam Composite

The results summarized above illustrate that the weight of hydrophilic foam coated on the scaffold increased by increasing the thickness of the hydrophilic polyurethane component.

Example 3

This example illustrates the preparation of foam composites by coating hydrophobic reticulated polyurethane scaffolds with undiluted polyurethane prepolymers having different viscosities. Prepolymers at three different temperatures were applied directly to Crest Foam® hydrophobic scaffolds as described below. The viscosity of commercial prepolymers was about 15,000 cps. at 25° C. By heating the prepolymers their viscosity was lowered significantly. Three different foam composites having three different levels of open cell hydrophilic polyurethane coating were obtained.

Three (3) samples of the Rynel® prepolymer as described above were heated to 30°, 35° and 40° C. Three (3) samples of Crest® foam as described in Example 1 were each dipped into a prepolymer dip tank and then squeezed between rubber rollers. The samples were immediately immersed in water at 25° C. to cure for about 30 minutes. The samples were dried and reweighed. They were soaked in water, patted dry and then weighed to determine the amount of water they could absorb. Table 7 below summarizes the results found in this example.

TABLE 7

Direct Coating of a Reticulated Foam

| Foam Property | Reticulated | Polymer @40° C. | Polymer @35° C. | Polymer @30° C. |
|---|---|---|---|---|
| Size | | | | |
| Length (cm) | 30.5 | 30.5 | 30.5 | 30.5 |
| Width (cm) | 30.5 | 30.5 | 30.5 | 30.5 |
| Thickness (cm) | 0.8 | 0.8 | 0.8 | 0.8 |
| Weight (grams) | 16 | 25* | 35* | 42* |
| Density (grms/cm3) | 0.021 | 0.034 | 0.047 | 0.056 |
| Coating Thickness (grams) | — | 9.0 | 19.0 | 26.0 |
| Water Saturated Weight (grams) | 18.0 | 43.0 | 75.0 | 99.0 |
| Grams Water Absorbed per Gram of Foam | 0.13 | 0.72 | 1.14 | 1.36 |

*Total Weight of Foam Composite

The above results indicate that the foam composites of the invention having a thicker coating of open cell hydrophilic polyurethane deposited as undiluted prepolymer absorbed increasing amounts of water.

Example 4

The relationship of the pore size of foam composites, the flow rate of water through columns packed with the foam composite of the invention and the ratio of hydrophobic foam cast. The above results indicate that the foam composites of the invention having a thicker coating of open cell hydrophilic polyurethane deposited as undiluted prepolymer absorbed increasing amounts of water.

Example 4

The relationship of the pore size of foam composites, the flow rate of water through columns packed with the foam composite of the invention and the ratio of hydrophobic foam cast on a hydrophobic reticulated foam scaffold is examined. The effect of these independent variables on the pressure drop across three (3) packed columns of foam composites was studied.

The equipment used included as follows:
(a) 0–25 oz/in$^2$ pressure gauge;
(b) 1.5 Schedule 40 PVC pipe, 7 inches long;
(c) Stop watch;
(d) Calibrated vessel to measure volume of the flow of water;
(e) Various fittings to build the apparatus shown in FIG. 30.

Three (3) columns as shown in FIG. 30 were packed with foam composites of the invention having a pore distribution of 10 ppi, 20 ppi and 45 ppi, respectively. The samples were made using the water emulsion method described in Example 1 using 0.1% Pluronic L62 (BASF Corp.) in water and Rynel® prepolymer to form an emulsion as described in Example 1, and Crest® Foam, T-10, T-20 and T-45 for the reticulated foam.

Care was taken not to over or under pack the column by die cutting circles of 1.56 inches in diameter and stacking them into the column to a thickness of 7 inches. The end caps were screwed on and the water passed through it. The flow of water was measured by determining the time to fill a calibrated vessel. The pressure was recorded at each flow rate. The flow and pressure of the system were measured at 39° F. and are reported in Table 8.

TABLE 8

| Flow Rate (gal/min) | 10 ppi | 20 ppi | 45 ppi |
|---|---|---|---|
| 1.1 | 1 | 1 | 1 |
| 1.7 | | | 3.5 |
| 1.8 | | | 4.9 |
| 2.1 | 2 | 2 | |
| 2.2 | | 1.4 | |
| 2.3 | | | 10.5 |
| 2.4 | 2.8 | | |
| 2.7 | | 6 | |
| 2.9 | | | 18 |
| 3.0 | | 9.5 | |
| 3.8 | 10 | | |
| 3.9 | | 20 | |
| 4.0 | 10 | 18 | |
| 4.6 | 18 | 28 | |
| 5.0 | 18 | | |

FIG. 31 is a plot of the data from Table 8. The experiments studied the relationship of flow and pressure drop on several reticulated foams. Crest® T-10, T-20 and T-45 having pores of 10 ppi, 20 ppi and 45 ppi, respectively were used for the hydrophobic polyurethane scaffold.

As is readily apparent from FIG. 30, the smaller the cell size the higher the pressure drop at any given flow rate.

Example 5

The experiment of Example 4 was repeated with foam composites according to the invention made with samples of Crest® T-10 foam and various amounts of hydrophilic foam. All samples were made using the water emulsion process of Example 1, except that different amounts of prepolymer emulsion as prepared in Example 1 were utilized to produce composites having different weights of open cell hydrophilic polyurethane coating. In Table 9 the amount of hydrophilic foam is expressed as H/R which is the ratio of the weight of the open cell hydrophilic polyurethane foam to the weight of the hydrophobic reticulate foam.

TABLE 9

| Flow Rate (gal/min) | 0 H/R | 1.1 H/R | 2.63 H/R | 3.71 H/R | 4.2 H/R |
|---|---|---|---|---|---|
| 1 | 1 | 1 | 1 | 1 | 1 |
| 1.4 | | | | 5.2 | 9 |
| 1.7 | | 1.5 | 1.7 | 9 | |
| 1.8 | | | | 10.5 | 18 |
| 2.1 | 2 | 3 | 4 | | |
| 2.2 | | | | | 15.5 |
| 2.4 | 2.8 | | | | |
| 2.7 | | | 10 | | |
| 3.0 | | 8 | 17 | | |
| 3.8 | 10 | | | | |
| 4.0 | 10 | 13 | | | |
| 4.6 | 15 | | | | |
| 5.0 | 17 | 20 | | | |

The plot of the data in Table 9 is shown in FIG. 32. As expected, as the amount of hydrophilic coating increases the pressure to pump water through the resulting foam composite increases at any given flow rate.

Example 6

A block of foam composite was made from a piece of Crest T-45 reticulated hydrophobic foam having a porosity of 45 ppi by the solvent method of Example 2. A solution of 35% Rynel® prepolymer in acetone at ambient temperature was employed. The dimensions of the reticulated hydrophobic foam block was 6 inches by 6 inch by 2 inches thick. Following processing, the block was skived into 0.25 inch sheets each sheet being a square of 6 inch by 6 inch by 0.25 inches in thickness. Each sheet of foam composite was weighed and the amount of hydrophilic coating was determined by the difference. Table 10 below illustrates the data obtained in this experiment.

TABLE 10

| Sheet No. | Wt. Reticulate (grams) | Wt. Foam Composite (grams) | Wt. Hydrophilic* (grams) | Grams Hydrophilic/grams Reticulate Hydrophobic* |
|---|---|---|---|---|
| 1 | 6.0 | 21.1 | 15.1 | 2.52 |
| 2 | 6.0 | 21.1 | 15.1 | 2.52 |
| 3 | 6.0 | 21.4 | 15.4 | 2.57 |
| 4 | 6.0 | 21.3 | 15.3 | 2.55 |
| 5 | 6.0 | 21.1 | 15.1 | 2.52 |
| 6 | 6.0 | 21.6 | 15.6 | 2.60 |

TABLE 10-continued

| Sheet No. | Wt. Reticulate (grams) | Wt. Foam Composite (grams) | Wt. Hydrophilic* (grams) | Grams Hydrophilic/grams Reticulate Hydrophobic* |
|---|---|---|---|---|
| 7 | 6.0 | 21.1 | 15.1 | 2.52 |
| 8 | 6.0 | 21.4 | 15.4 | 2.57 |

*types of polyurethane

The above data indicates a high level of uniformity in the penetration of the hydrophilic polyurethane coating into the hydrophobic polyurethane scaffold.

Examples 7–15

These examples illustrate the relationship between foam composites prepared by the solvent and direct cast processes, the weight of the hydrophilic polyurethane coating and viscosity. The foam composites of examples 7 to 10 were prepared by the solvent method according to the procedure described in Example 2 using the same prepolymer and other processing conditions. Samples of Crest® reticulated hydrophobic polyurethane foam having a pore size of 20 ppi were coated with different concentrations of prepolymer solution in acetone at 68° C. The weight of the reticulated polyurethane foam, open cell hydrophilic polyurethane and the ratio of one to the other is summarized in Table 11 and have been plotted in FIG. 33.

TABLE 11

Solvent and Direct Cast Process

| Examples | Wt. Prepolymer (grams) | Wt. Acetone (grams) | % Prepolymer (grams) | Temperature (grams) | Wt. Reticulate (grams) | Wt. Coating (grams) | Wt. Foam Composite (grams) | Hydrophilic/ Reticulate |
|---|---|---|---|---|---|---|---|---|
| 7 | 100 | 30 | 77% | 68 | 9.0 | 29.0 | 38.0 | 3.2 |
| 8 | 100 | 50 | 67% | 68 | 9.0 | 25.0 | 34.0 | 2.8 |
| 9 | 100 | 70 | 59% | 68 | 9.0 | 20.0 | 29.0 | 2.2 |
| 10 | 56 | 216 | 21% | 68 | 9.0 | 6.0 | 15.0 | 0.7 |
| 11 | 100 | 0 | 100% | 100 | 9.0 | 90.0 | 99.0 | 9.0 |
| 12 | 100 | 0 | 100% | 118 | 9.0 | 60.0 | 69.0 | 6.7 |
| 13 | 100 | 0 | 100% | 145 | 9.0 | 58.5 | 67.5 | 5.5 |
| 14 | 100 | 0 | 100% | 178 | 9.0 | 48.6 | 57.6 | 4.4 |
| 15 | 100 | 0 | 100% | 200 | 9.0 | 40.0 | 49.0 | 4.0 |

It is readily apparent from FIG. 33 that the higher the concentration of prepolymer in the acetone solvent, the higher the weight of the hydrophilic polyurethane coating deposited onto the polyurethane scaffold.

The foam composites of Examples 11–15 were prepared by the direct cast method according to the procedure described in Example 3. Samples of Crest® reticulated hydrophobic polyurethane foam having a pore size of 20 ppi were coated with 100% Rynel® prepolymer at temperatures graphed in FIG. 34 and otherwise processed as described in Example 3. The characteristics of the foam composites of examples 11–15 are also summarized in Table 11. FIG. 34 illustrates the effect of temperature on the foam composites of examples 11–15.

It is readily apparent that as the temperature of the prepolymer in liquid phase is increased, the weight of the hydrophilic polyurethane coating deposited decreases.

Example 16

Artificial lobster bait was prepared as follows. Attractants were prepared from (1) herring brine taken from the bottom of a barrel of salted herring, (2) a concentrated soup stock of crab, (3) a concentrated soup stock of clams (4) ground crabs and (5) ground herring. The crabs (4) and herring (5) were ground in a Waring Laboratory Blender.

Lobster baits were prepared form 59 gram sheets of reticulated foam (T20 from Crest Foam of New Jersey). In each experiment 100 grams of an emulsion comprised of equal weight portions of hydrophilic polyurethane (Suprasec 1002 from Huntsman Polyurethane, Brussels, Belgium) and the attractant were applied to the reticulate. The emulsion was massaged into the reticulated foam.

Figure 38:
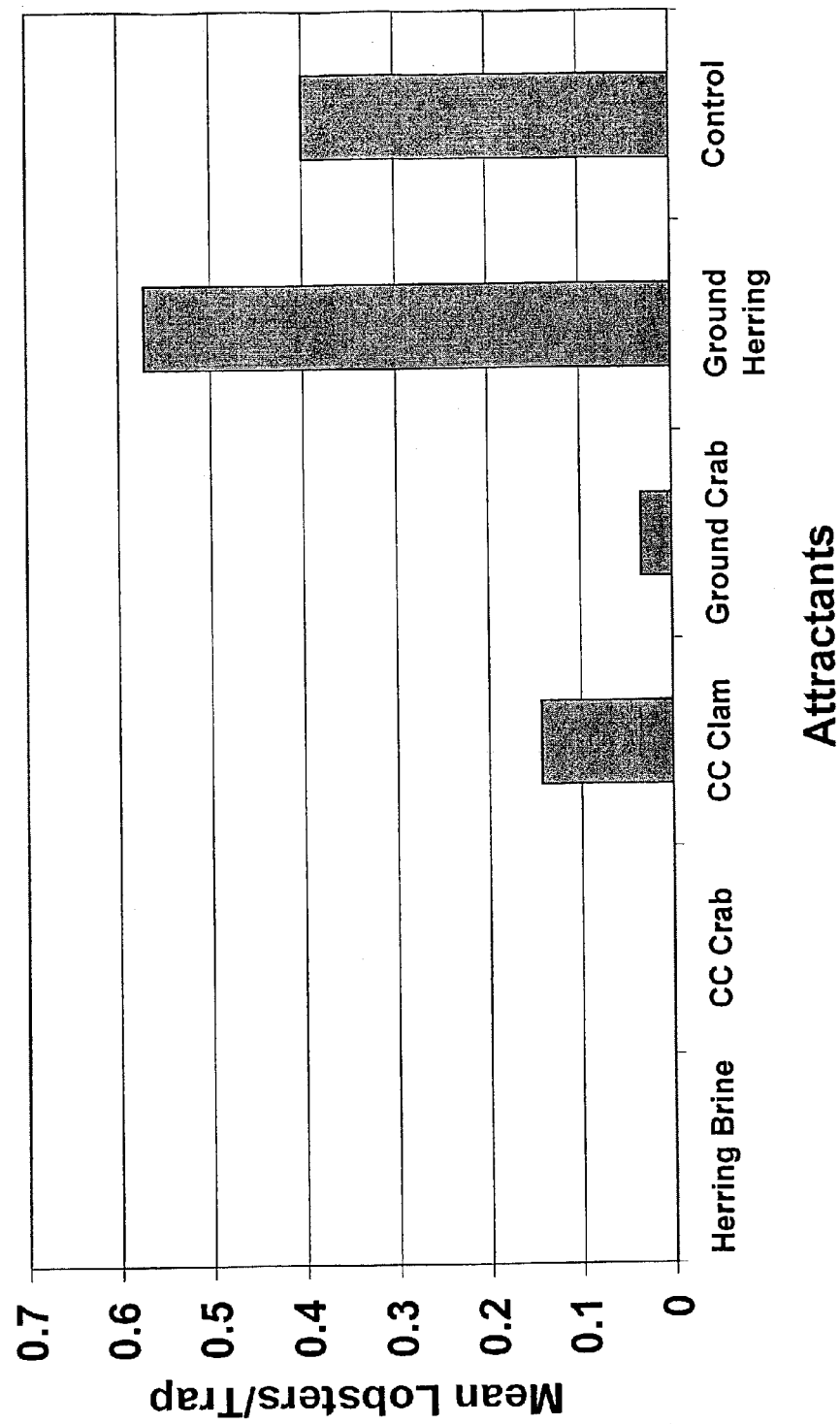
FIG. 38 is a bar graph showing the results obtained by lobster fisherman using the lobster baits prepared as described in Example 16.

The baits thus prepared were allowed to cure and then cut into individual bait samples 6"×6"×0.25". The baits were delivered to fisherman who used them as lobster bait in traps placed in the Gulf of Maine for a minimum of 3 days. Whole herring, the regular bait, was used as the control. The comparative results are described in FIG. 38 which shows that the ground herring impregnated in the composite of the invention was nearly 50% more effective than standard herring bait.

FIG. 35 depicts an apparatus which operates continuously to remove pollutants from a waste stream. The belt containing the composite of the invention moves continuously through the tank which contains a solution containing a pollutant. Biomass builds up on the belt in accordance with normal biological procedures. The belt is indexed outside the tank where it is squeezed or hydro-blasted or subjected to a strong stream of air to dislodge the biomass. The belt is then indexed or continuously advanced back into the tank where it will again develop biomass.

The apparatus of FIG. 35 may also be used as a cold, solvent recovery device. The belt is used to extract a valuable, water-soluble component from a solvent. The valuable component may be removed from the belt by vaporizing it.

Since the composites of the invention are biocompatible and can be impregnated with nutrients, they can be used to collect biological samples. Thus the composites can be placed in a pond or other body of water where they will become colonized by resident microorganisms. Alternatively, they can be inoculated with specific organisms (an alga, for instance) or a variety of microorganisms that feed on that pollutant. A microscopic analysis of the composite will indicate the presence or absence of a specific pollutant. Alternatively, a nutrient specific to a bacterial specie can be included in the composite formulation so that only that microorganism, (e.g. coliforms or cryptosporidia) will propagate. Alternatively a sampling system can be provided that is made up of a long ribbon of composite that is coiled up and placed in a mesh cylinder. When placed in or dragged through a body of water, the composite will become colonized with microorganisms. The composite is then removed from the mesh cylinder, unrolled and passed under an optical scanner to detect colonies of microorganisms. It can be subjected to biological stains to make the organisms more visible. The composite can also be incubated to increase the resident populations.

Figure 36:
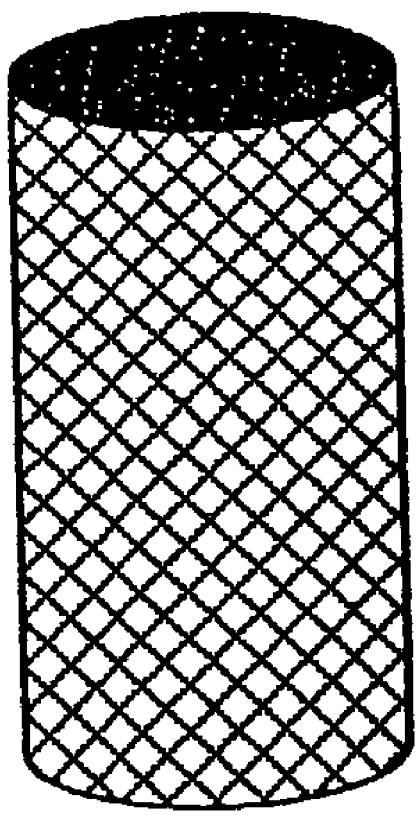
FIG. 36 is a schematic representation of a biofilter cartridge using the composites of the invention.

FIG. 36 depicts a biofilter cartridge for use in methods to remove odor-producing components of air exhausted from a manufacturing plant or a water waste treatment facility. The cartridge is comprised of composite encased in a rigid or semi-rigid mesh material. The composite will become colonized with microorganisms. When placed in a stream of air that contains a pollutant, microorganisms will develop that will feed on that pollutant.

In a specific example, a biofilter cartridge can be made composed of composite coiled in a polyethylene or polypropylene mesh cylinder. The composite containing cylinder is placed in an apparatus through which air, from a municipal water-waste treatment plant, is passed. The exhausted air contains hydrogen sulfide and a variety of microorganisms. After a time, thiobacillus bacteria will proliferate on the composite. When a colony of sufficient size develops, the microorganisms will consume the hydrogen sulfide in the air stream, thus reducing its concentration and eliminating odor. The initiation time, the time it takes for the biofilter to develop a large enough colony of microorganisms to reduce the pollutant to an acceptable level, can be effectively reduced by placing the cartridge in an environment where the population of the important microorganism is high. For example, if the cartridge is placed in a waste treatment pond for several hours, it will become colonized with a wide variety of organisms, some of which will be effective at reducing the target pollutant.

Some pollutants, specifically synthetic chemicals, may not have organisms that readily metabolize them. In such cases the initiation time can be prohibitively long. A recent study on MtBE revealed an initiation time of one year. In such cases a composite can be formulated with an organism that is specifically developed, e.g. by generic engineering, or by harvesting an organism from a successful system.

Figure 37:
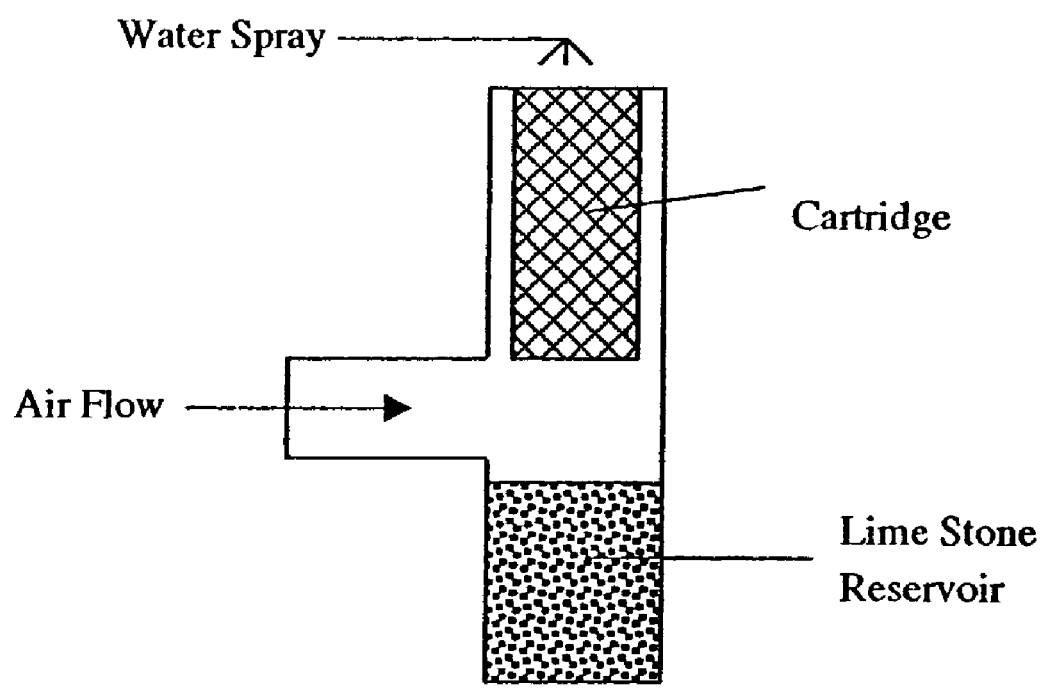
FIG. 37 is a schematic representation of a filtration process using the cartridge of FIG. 36.

In a variation, biofilters can be placed into trickling filters in which water is continuously fed to the top of the cartridge and flows through it. A cartridge containing thiobacillus will produce sulfur dioxide. The sulfur dioxide dissolves in the water yielding sulfurous acid. If the acidic water is allowed to contact limestone, the reaction produces carbon dioxide. FIG. 37 discloses an apparatus which uses the carbon dioxide to feed the thiobacillus, which in turn uses it to produce biomass.

Composite can also be saturated with water and frozen to serve as a cold pack for wrapping injuries or for shipping of temperature sensitive products. Composites can be formulated to contain minerals or other materials or to contain waxes or other components that melt and freeze at specific temperatures, thus maintaining a specific temperature as the substance releases or absorbs heat at that temperature.

Thus, while there have been described what are presently believed to be preferred embodiments of the present invention, those skilled in the art will realize that other and further modifications and changes can be made without departing from the true spirit of the invention, and it is intended to include all such changes and modifications as come within the scope of the invention. Further, the embodiments of the invention in which exclusive rights are claimed are defined as follows:

What is claimed is:

1. A foam composite comprising:
    a scaffold of an open cell hydrophobic polyurethane foam, said scaffold having a plurality of surfaces defining a plurality of pores; and
    a coating of a substantially open cell hydrophilic polyurethane foam disposed upon said plurality of surfaces of said hydrophobic polyurethane foam;
    wherein said foam composite exhibits structural characteristics of said hydrophobic polyurethane foam and absorbency characteristics of said open cell hydrophilic polyurethane foam.

2. The foam composite of claim 1, wherein said coating is from about 1% to about 90% by weight of said foam composite.

3. The foam composite of claim 1, wherein said coating is the in situ reaction product of a hydrophilic polyurethane prepolymer emulsion having a prepolymer phase and an aqueous phase.

4. The foam composite of claim 3, wherein the ratio of said aqueous phase to said prepolymer phase is from about 0.8:1 to about 2.2:1.

5. The foam composite of claim 1, wherein said coating is prepared by the in situ deposition of a hydrophilic polyurethane prepolymer from a solution of said polymer in a nonreactive solvent.

6. The foam composite of claim 5, wherein said hydrophilic polyurethane prepolymer solution is from about 1% by weight to about 60% by weight prepolymer.

7. The foam composite of claim 5, wherein said nonreactive solvent is selected from the group comprising acetone, toluene, xylene, benzene and mixtures thereof.

8. The foam composite of claim 1, wherein said open cell hydrophilic polyurethane foam comprises the polymerization products of an isocyanate-capped polyether prepolymer having an isocyanate functionality from about 5% by weight to about 15% by weight of said prepolymer.

9. The foam composite of claim 8, wherein said isocyanate-capped polyether prepolymer has an isocyanate functionality from about 6% by weight to about 9% by weight of said prepolymer.

10. The foam composite of claim 1, wherein said foam composite has a pore size distribution from about 4 pores per linear inch to about 100 pores per linear inch.

11. The foam composite of claim 1, wherein said foam composite has a void volume from about 20% to about 98%.

12. The foam composite of claim 1, wherein said foam composite has a surface area from about 100 $ft^2$ per cube foot to about 2,000 $ft^2$ per cubic foot of foam composite.

13. The foam composite of claim 12, wherein said foam composite has a surface area of from about 300 $ft^2$ per cubic foot to about 2000 $ft^2$ per cubic foot of foam composite and a pore size distribution in the range from about 10 pore/linear inch to about 95 pore/linear inch.

14. The foam composite of claim 1, wherein said foam composite has a rate of absorbency for water at 20° C. from about 0.1 seconds to about 60 seconds.

15. The foam composite of claim 1, wherein said foam composite has a pressure drop of about 0.14 inches of water to about 2.7 inches water for 575 ft/minute of dry air through a foam composite having a surface area of 1 $ft^2$, a thickness of 1 inch and a pore size in the range from about 10 pore/linear inch to about 90 pore/linear inch.

16. The foam composite of claim 1, wherein said foam composite has a pressure drop rate of from about 0.1 psi to about 2 psi for about 2 gallons of water at 39° F. through about 2 in² of foam composite having a thickness of 7 inches for foam composites having a weight ratio of hydrophilic polyurethane foam to hydrophobic polyurethane foam in the range of from about 0.1 to 1 to about 4.0 to 1 over a pore size distribution range from about 10 pore/linear inch 45 pore/linear inch.

17. The foam composite of claim 16, wherein said foam composite has a pore size distribution in the range 10 pores per linear inch to 100 pores per linear inch.

18. The foam composite of claim 1, wherein said coating of hydrophilic polyurethane foam has a coating weight from about 0.5 grams hydrophilic foam/gram hydrophobic foam to about 10 grams hydrophilic foam/gram hydrophobic foam.

19. The foam composite of claim 1, wherein said foam composite has a tensile strength from about 10 psi to 35 psi over a pore size distribution range from about 10 ppi to about 90 ppi.

20. The foam composite of claim 1, wherein said foam composite has an elongation characteristic from about 150% to about 260% by weight over a pore size distribution range from about 10 ppi to about 100 ppi.

21. The foam composite of claim 1, wherein said hydrophilic polyurethane coating further comprises an additive.

22. The foam composite of claim 21, wherein said additive is a non-bioactive ingredient.

23. The foam composite of claim 22, wherein said non-bioactive ingredient comprises a hydrogel, a filler, an activated charcoal, a zeolite, an ion exchange resin, a phase change material or mixtures thereof.

24. The foam composite of claim 23, wherein said hydrogel is a polysaccharide hydrogel or an acrylic hydrogel.

25. The foam composite of claim 24, wherein said polysaccharide hydrogel is an alginate, a carrageenan, an agar, an agarose, a curdlan, a pullulan, a gellan or mixtures thereof.

26. The foam composite of claim 24, wherein said hydrogel is in an amount from about 0.1% to about 90% by weight of said hydrophilic polyurethane coating.

27. The foam composite of claim 24, wherein said acrylic hydrogel is a polyacrylamide, a poly (ethyl methacrylate), a poly (glycol methacrylate), a poly (hyroxy methyl acrytate), a poly (sodium acrylate) or mixtures thereof.

28. The foam composite of claim 22 wherein said bioaffecting agent comprises a pharmaceutical, a fragrance, a soap, a herbicide, a pesticide, a yeast, a bacterium, a algae, an enzyme, a plant, an animal cell, a human cell, or mixtures thereof.

29. The foam composite of claim 1, further comprising an non-bioactive ingredient or a bioaffecting agent.

30. The foam composite of claim 29, wherein said non-bioactive ingredient or said bioaffecting agent is immobilized within said foam composite.

31. The foam composite of claim 30, wherein said non-bioactive ingredient comprises a hydrogel, a filler, an activated charcoal, a zeolite, an ion exchange resin, a phase change material or mixtures thereof.

32. The foam composite of claim 30, wherein said bioaffecting agent comprises a pharmaceutical, a fragrance, a soap, a yeast, a herbicide, a pesticide, an enzyme, a bacterium, a algae, a plant, an animal cell, a human cell or mixtures thereof.

33. The foam composite of claim 29, wherein said bioaffecting agent is grafted onto said non-bioactive ingredient.

34. The foam composite of claim 33, wherein said non-bioactive ingredient is a hydrogel.

* * * * *